US007228805B2

(12) United States Patent
Beers et al.

(10) Patent No.: US 7,228,805 B2
(45) Date of Patent: *Jun. 12, 2007

(54) TEMPERATURE CONTROLLED RAILWAY CAR

(75) Inventors: Albert A. Beers, Duncanville, TX (US); Stephen W. Smith, Dallas, TX (US); Christopher Crisafulli, Mansfield, TX (US); Shaun Richmond, Dallas, TX (US); Ricky A. Cribbs, Cedar Hill, TX (US)

(73) Assignee: Trinity Industries, Inc., Dallas, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 11/009,128

(22) Filed: Dec. 10, 2004

(65) Prior Publication Data
US 2005/0178285 A1    Aug. 18, 2005

Related U.S. Application Data

(63) Continuation-in-part of application No. 10/424,279, filed on Apr. 28, 2003, now Pat. No. 6,941,875.

(60) Provisional application No. 60/576,544, filed on Jun. 3, 2004.

(51) Int. Cl.
*B61D 17/00* (2006.01)

(52) U.S. Cl. ........................ 105/423; 105/404; 105/409

(58) Field of Classification Search ................ 105/396, 105/423, 422, 404, 409, 410, 413, 355; 220/1.5, 220/592.2; 52/404.1; 296/180.3, 191, 197, 296/183, 187, 188
See application file for complete search history.

(56) References Cited

U.S. PATENT DOCUMENTS 3,003,810 A    10/1961  Kloote et al. ................ 296/181

(Continued)

OTHER PUBLICATIONS

Union Pacific Railroad, Trinity Rail Group, Mechanical Engineering Design Review, 2 pages, Mar. 25, 2003.

(Continued)

*Primary Examiner*—Mark T. Le
(74) *Attorney, Agent, or Firm*—Baker Botts L.L.P.

(57) ABSTRACT

A composite box structure mounted on and attached to a railway car underframe to form a temperature controlled railway car. The composite box structure defined in part by an exterior metal surface, interior side stakes and at least one layer of fiber reinforced material attached to the side stakes. Insulating material may be disposed between the side stakes, the exterior metal surface and the at least one fiber reinforced layer of fiber reinforced material. The insulating materials provide resistance to heat transfer between the interior and the exterior of the composite box structure. A primary floor assembly and a secondary floor assembly may be mounted on the railway car underframe.

20 Claims, 16 Drawing Sheets

U.S. PATENT DOCUMENTS

| | | | |
|---|---|---|---|
| 3,142,265 A | 7/1964 | Ford | 105/423 |
| 3,187,853 A | 6/1965 | Glaser et al. | 52/377 |
| 3,206,946 A | 9/1965 | Lindersmith et al. | 62/407 |
| RE26,131 E | 12/1966 | Johansson | 105/409 |
| 3,301,147 A | 1/1967 | Clayton et al. | 404/35 |
| 3,323,471 A | 6/1967 | Dean et al. | 105/401 |
| 3,481,642 A | 12/1969 | Bonallack et al. | 296/31 |
| 3,711,148 A | 1/1973 | Hindin | 296/28 |
| 3,746,388 A | 7/1973 | Robinson | 296/28 |
| 3,777,430 A | 12/1973 | Tischuk | 52/309 |
| 4,122,641 A | 10/1978 | Bard et al. | 52/396.06 |
| 4,404,057 A | 9/1983 | Morrison et al. | 156/324 |
| 4,612,744 A | 9/1986 | Shamash | 52/220 |
| 5,088,434 A | 2/1992 | Harding | 114/85 |
| 5,109,777 A | 5/1992 | Ohmura et al. | 105/401 |
| 5,113,769 A | 5/1992 | Okuno et al. | 105/422 |
| 5,274,979 A | 1/1994 | Tsai | 52/595 |
| 5,277,011 A | 1/1994 | Serrano Martin | 52/588.1 |
| 5,333,554 A | 8/1994 | Yamada et al. | 105/397 |
| 5,403,063 A | 4/1995 | Sjostedt et al. | 296/187 |
| 5,460,290 A | 10/1995 | Hanning et al. | 220/694.1 |
| 5,677,029 A | 10/1997 | Prevorsek et al. | 428/113 |
| 5,685,229 A | 11/1997 | Ohara et al. | 105/397 |
| 5,716,487 A | 2/1998 | Sumerak | 156/359 |
| 5,730,485 A | 3/1998 | Sjostedt et al. | 296/182 |
| 5,765,485 A | 6/1998 | Thoman et al. | 105/404 |
| 5,802,984 A | 9/1998 | Thoman et al. | 105/404 |
| 5,811,035 A | 9/1998 | Mockry | 261/111 |
| 5,851,446 A | 12/1998 | Bardo et al. | 261/111 |
| 5,857,414 A * | 1/1999 | Thoman et al. | 105/397 |
| 5,868,080 A | 2/1999 | Wyler et al. | 108/57.25 |
| 5,890,435 A | 4/1999 | Thoman et al. | 105/404 |
| 5,988,074 A | 11/1999 | Thoman | 105/404 |
| 6,000,342 A | 12/1999 | Thoman et al. | 105/413 |
| 6,138,580 A | 10/2000 | Thoman | 105/396 |
| 6,199,488 B1 | 3/2001 | Favaron et al. | 108/57.25 |
| 6,227,125 B1 | 5/2001 | Schroeder et al. | 105/401 |
| 6,233,892 B1 | 5/2001 | Tylman | 52/309.12 |
| 6,251,185 B1 | 6/2001 | Morrison et al. | 118/681 |
| 6,257,800 B1 | 7/2001 | Masters | 405/224 |
| 6,290,279 B1 | 9/2001 | Haight et al. | 296/97.23 |
| 6,395,210 B1 | 5/2002 | Head et al. | 264/137 |
| 6,508,076 B1 | 1/2003 | Gast et al. | 62/408 |
| 6,722,287 B2 | 4/2004 | Norton et al. | 105/404 |
| 2006/0065152 A1 | 3/2006 | Heitmeyer et al. | 105/404 |

OTHER PUBLICATIONS

Roof Appl Drawing, R-004-7008, 2 pgs, Mar. 25, 2003.
Side Construction Assy Right Side, S-003-7056, 1 pg, Mar. 25, 2003.
End Arrangement A-End, M-012-7065, 1 pg, Mar. 25, 2003.
End Arrangement B-End, M-012-7064, 1 pg, Mar. 25, 2003.
Section Thru Car 64 Ft Refrigerated Steel Box Car, M-022-7027, 5 pgs, Mar. 25, 2003.
Trinity Vision News Letter—Railcar News from Trinity Industries, Fall 2000 pp. 1-8.

* cited by examiner

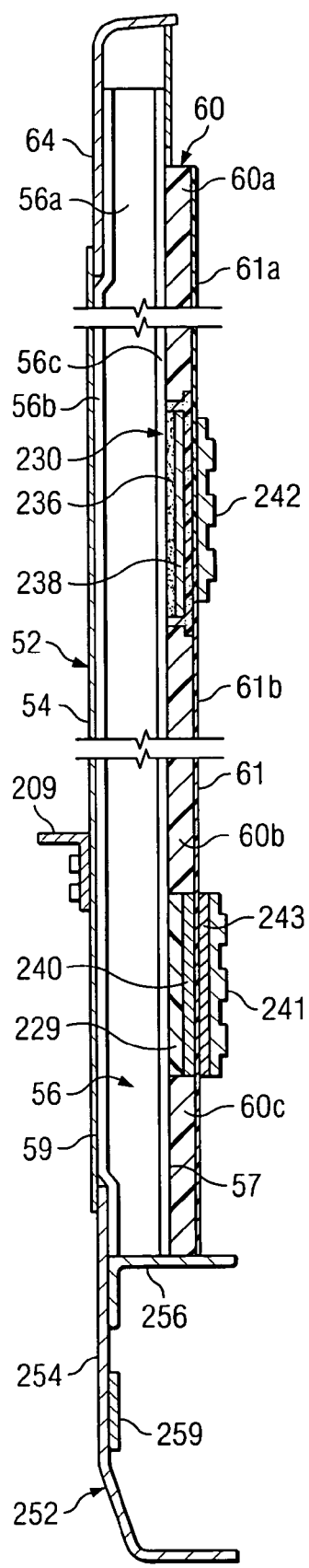
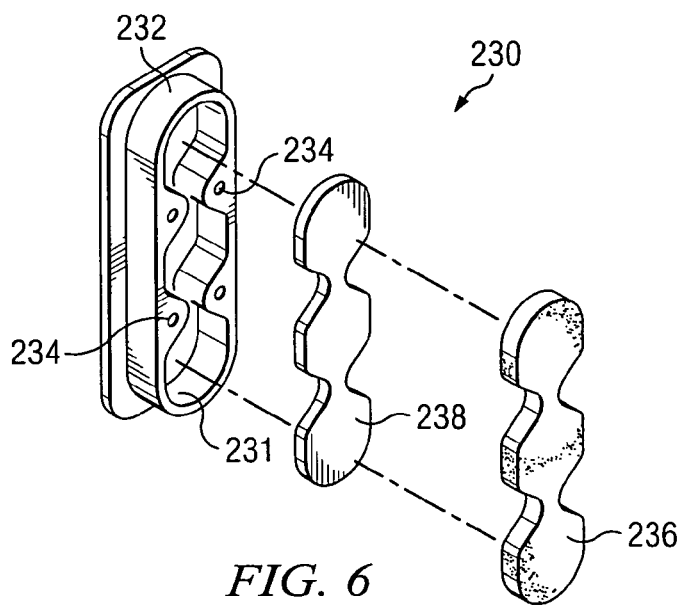
FIG. 6
FIG. 5

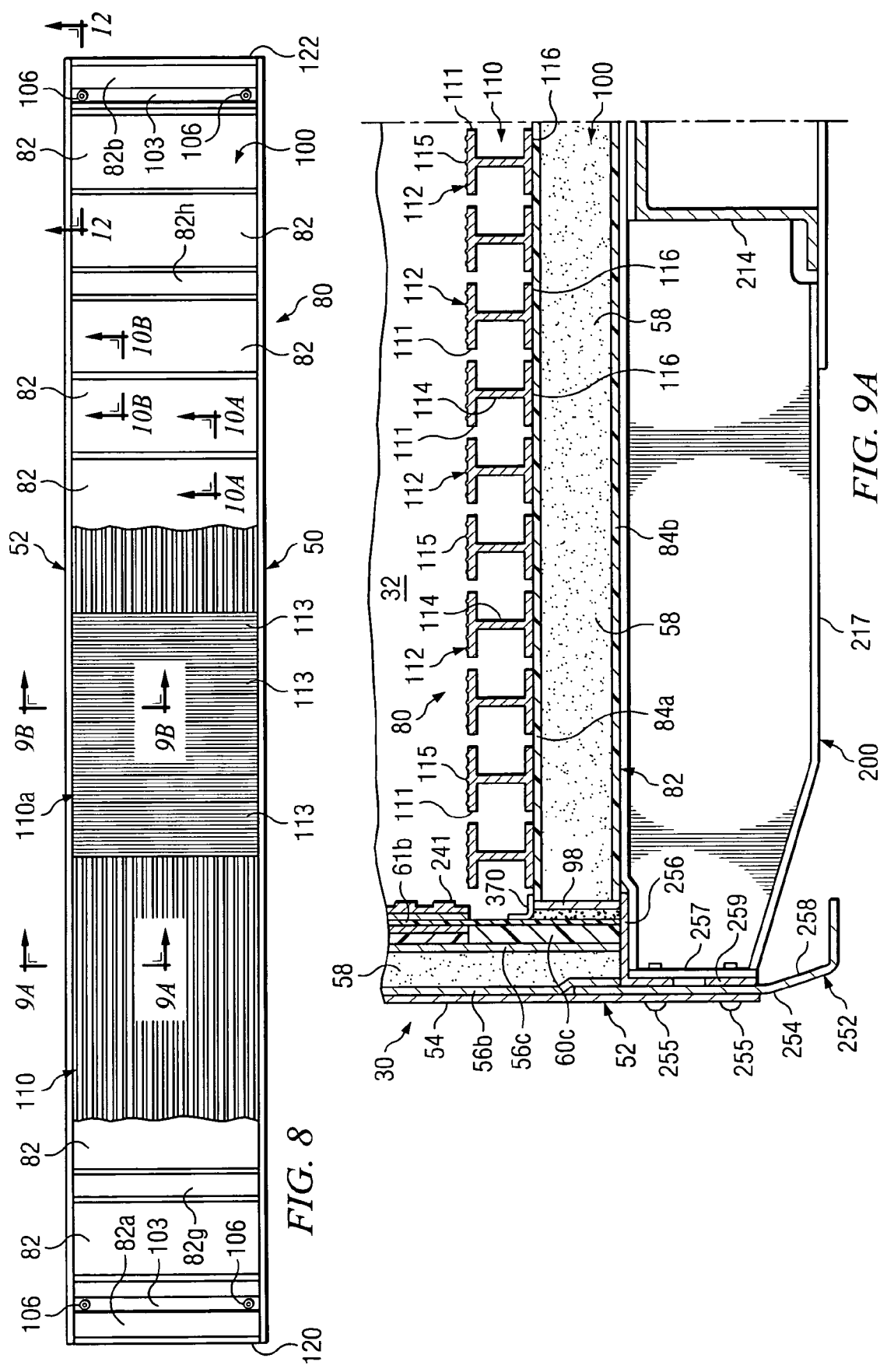

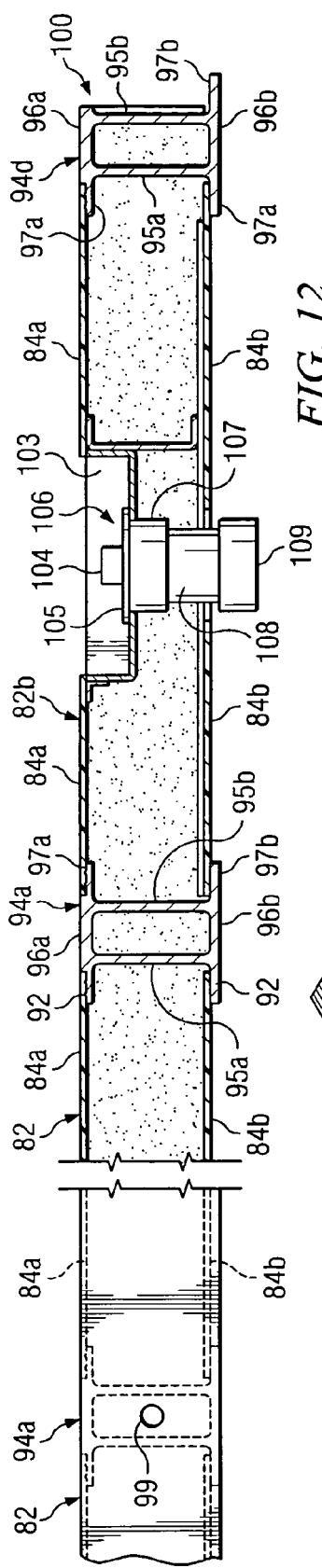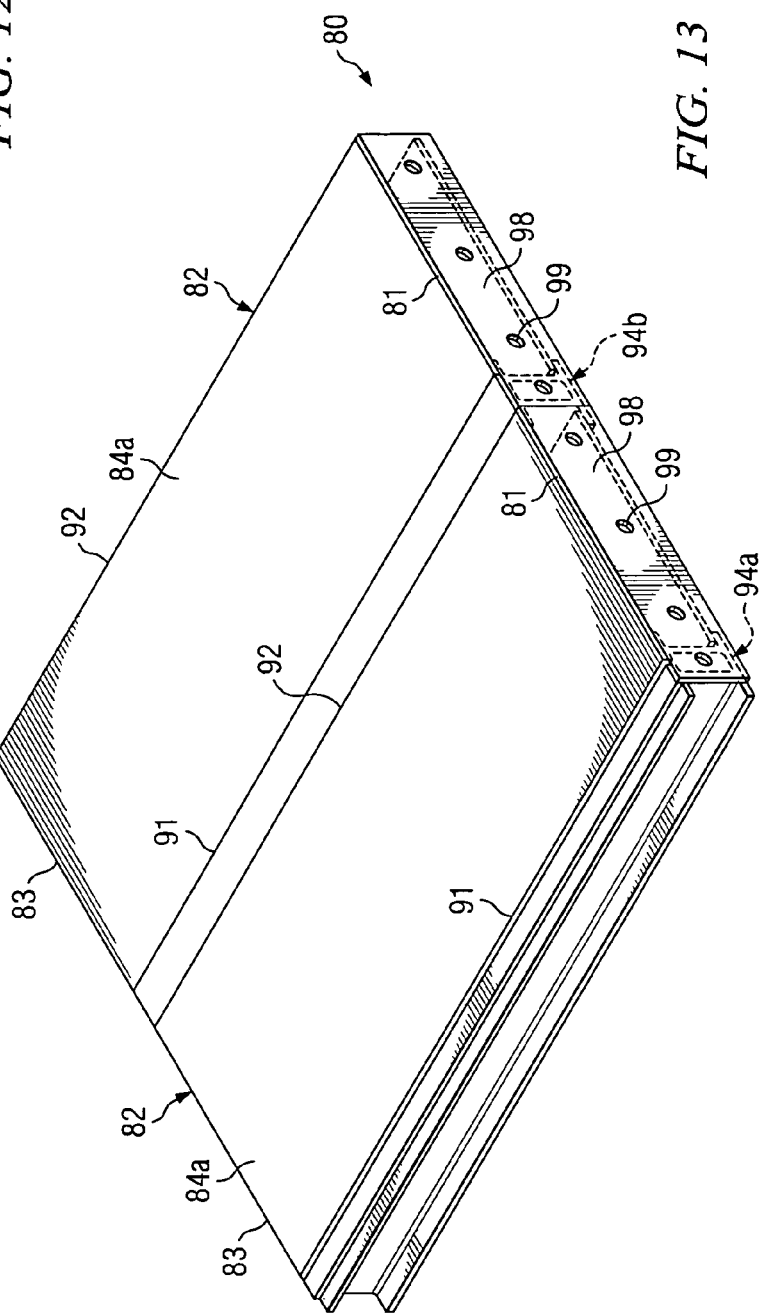

TEMPERATURE CONTROLLED RAILWAY CAR

RELATED APPLICATION

This application claims the benefit of Provisional Patent Application Ser. No. 60/576,544 entitled "Temperature Controlled Railway Car" filed Jun. 3, 2004.

This application is a Continuation-In-Part Application of pending U.S. Divisional application Ser. No. 10/424,279 entitled "Temperature Controlled Railway Car" filed Apr. 28, 2003, now U.S. Pat. No. 6,941,875, which claims the benefit of U.S. application Ser. No. 10/071,168 entitled "Temperature Controlled Railway Car", filed Feb. 8, 2002, now U.S. Pat. No. 6,575,102, which claims the benefit of U.S. Provisional Application Ser. No. 60/267,882 entitled "Temperature Controlled Railway Car" filed Feb. 9, 2001.

This application is related to copending U.S. patent application Ser. No. 10/071,165 entitled "Pultruded Panel filed Feb. 8, 2002, now abandoned copending U.S. patent application Ser. No. 10/071,173 entitled "Roof Assembly and Airflow Management System for a Temperature Controlled Railway Car" filed Feb. 8, 2002, now U.S. Pat. No. 6,722,287; and copending U.S. patent application Ser. No. 10/071,513 entitled "Manufacturing Facility and Method of Assembling Temperature Controlled Railway Car" filed Feb. 8, 2002, now U.S. Pat. No. 6,892,433, which all claim priority from the same U.S. Provisional Application Ser. No. 60/267,882 filed Feb. 9, 2001.

TECHNICAL FIELD

The present invention is related to railway cars and more particularly to a composite box structure mounted on a railway car underframe to provide an insulated railway boxcar or a temperature controlled railway car.

BACKGROUND OF THE INVENTION

Over the years, general purpose railway boxcars have progressed from relatively simple wooden structures mounted on flat cars to more elaborate arrangements including insulated walls and refrigeration equipment. Various types of insulated boxcars are presently manufactured and used. A typical insulated boxcar includes an enclosed structure mounted on a railway car underframe. The enclosed structure generally includes a floor assembly, a pair of sidewalls, a pair of endwalls and a roof. The sidewalls, endwalls and roof often have an outer shell, one or more layers of insulation and interior paneling.

The outer shell of many railway boxcars often has an exterior surface formed from various types of metal such as steel or aluminum. The interior paneling is often formed from wood and/or metal as desired for the specific application. For some applications the interior paneling has been formed from fiber reinforced plastic (FRP). Various types of sliding doors including plug type doors are generally provided on each side of conventional boxcars for loading and unloading freight. Conventional boxcars may be assembled from various pieces of wood, steel and/or sheets of composite materials such as fiberglass reinforced plastic. Significant amounts of raw material, labor and time are often required to complete the manufacture and assembly of conventional boxcars.

The underframe for many boxcars include a center sill with a pair of end sill assemblies and a pair of side sill assemblies arranged in a generally rectangular configuration corresponding approximately with dimensions for the floor of the boxcar. Cross bearers are provided to establish desired rigidity and strength for transmission of vertical loads to the associated side sills which in turn transmit the vertical loads to the associated body bolsters and for distributing horizontal end loads on the center sill to other portions of the underframe. Cross bearers and cross ties cooperate with each other to support a plurality of longitudinal stringers. The longitudinal stringers are often provided on each side of the center sill to support the floor of a boxcar. Examples of such railway car underframes are shown in U.S. Pat. Nos. 2,783,718 and 3,266,441.

Some railway cars or boxcars may be manufactured using sidewall assemblies with all or portions of a respective side sill assembly formed as an integral component thereof. In a similar manner, such railway cars and/or boxcars may also be manufactured with endwall assemblies having all or portions of a respective end sill formed as an integral component thereof.

Traditionally, refrigerated boxcars often have less inside height than desired for many types of lading and a relatively short interior length. Heat transfer rates for conventional insulated boxcars and refrigerated boxcars are often much greater than desired. Therefore, refrigeration systems associated with such boxcars must be relatively large to maintain desired temperatures while shipping perishable lading.

A wide variety of composite materials have been used to form railway cars and particular boxcars. U.S. Pat. No. 6,092,472 entitled "Composite Box Structure For A Railway Car" and U.S. Pat. No. 6,138,580 entitled "Temperature Controlled Composite Boxcar" show some examples. One example of a composite roof for a railway car is shown in U.S. Pat. No. 5,988,074 entitled "Composite Roof for a Railway Car".

Ballistic resistant fabrics such as Bulitex® scuff and wall liners have previously been used to form liners for highway truck trailers.

SUMMARY OF THE INVENTION

In accordance with teachings of the present invention, several disadvantages and problems associated with insulated boxcars, refrigerated boxcars and other types of railway cars have been substantially reduced or eliminated. One embodiment of the present invention includes a composite box structure with a temperature control system and an airflow management system satisfactory for use with a refrigerated boxcar or a temperature controlled railway car. Another embodiment of the present invention includes a composite box structure which may be satisfactory for use with an insulated boxcar.

A composite box structure formed in accordance with teachings of the present invention provides enhanced insulation, increased load carrying capacity, better temperature regulation, increased service life, and reduced maintenance costs as compared to a typical refrigerated boxcar. The present invention allows designing floor assemblies, sidewall assemblies and endwall assemblies with insulating materials having optimum thickness to substantially minimize heat transfer rates between the interior and the exterior of a resulting composite box structure and to maximize interior load carrying capacity. Structural integrity of a resulting composite box structure may be maintained using conventional materials such as steel alloys or aluminum alloys to form exterior portions and associated supporting structures.

A composite box structure for a railway car may be formed in accordance with teachings of the present invention with similar or reduced costs as compared to conventional refrigerated boxcars and insulated boxcars and may have substantially improved load carrying capacity and thermal energy characteristics. Many structural members of the resulting railway car may formed from steel alloys and other materials which may more easily be repaired as compared with some composite materials. Composite materials with substantially improved insulation characteristics may be used as nonstructural members to improve heat transfer characteristics while at the same time increasing load carrying capability.

Technical benefits of the present invention include covering interior surfaces of metal components used to form the composite box structure with one or more layers of insulating material. Horizontal strips of fiber reinforced materials may be disposed on interior surfaces of the composite box structure. A plurality of generally vertical corrugations may be formed in each horizontal strip. For some applications scuff plates may be attached to interior surfaces of the box structure. Various benefits associated with fabricating sidewall assemblies, endwall assemblies and floor assemblies in accordance with teachings of the present invention will be discussed throughout this application.

BRIEF DESCRIPTION OF THE DRAWINGS

For a more complete understanding of the present invention, and the advantages thereof, reference is now made to the following written description taken in conjunction with the accompanying drawings, in which:

FIG. 5 is a schematic drawing in section with portions broken away showing various features of a sidewall assembly incorporating teachings of the present invention;

FIG. 6 is a schematic drawing showing an exploded isometric view of an isolator assembly which may be satisfactorily used to mount a scuff plate on a sidewall assembly in accordance with teachings of the present invention;

FIG. 8 is a schematic drawing with portions broken away showing a plan view of a floor assembly incorporating teachings of the present invention;

FIG. 9A is a schematic drawing in section with portions broken away showing taken along lines 9A—9A of FIG. 8 a sidewall assembly and a floor assembly mounted on a railway car underframe in accordance with teachings of the present invention;

FIG. 12 is a schematic drawing in section with portions broken away taken along lines 12—12 of FIG. 8;

FIG. 13 is a schematic drawing showing an isometric view of a pultruded panel which may be used to form a floor assembly in accordance with teachings of the present invention;

DETAILED DESCRIPTION OF THE INVENTION

Preferred embodiments of the invention and its advantages are best understood by reference to FIGS. 1A–19 of the drawings, like numerals are used for like and corresponding parts of the various drawings.

Various aspects of the present invention will be described with respect to temperature controlled railway car 20. However, the present invention is not limited to temperature controlled railway cars. For example, various features of the present invention may be satisfactorily used to form insulated boxcars and any other type of freight car or railway car having sidewall assemblies and/or endwall assemblies mounted on a railway car underframe.

Figure 1A:
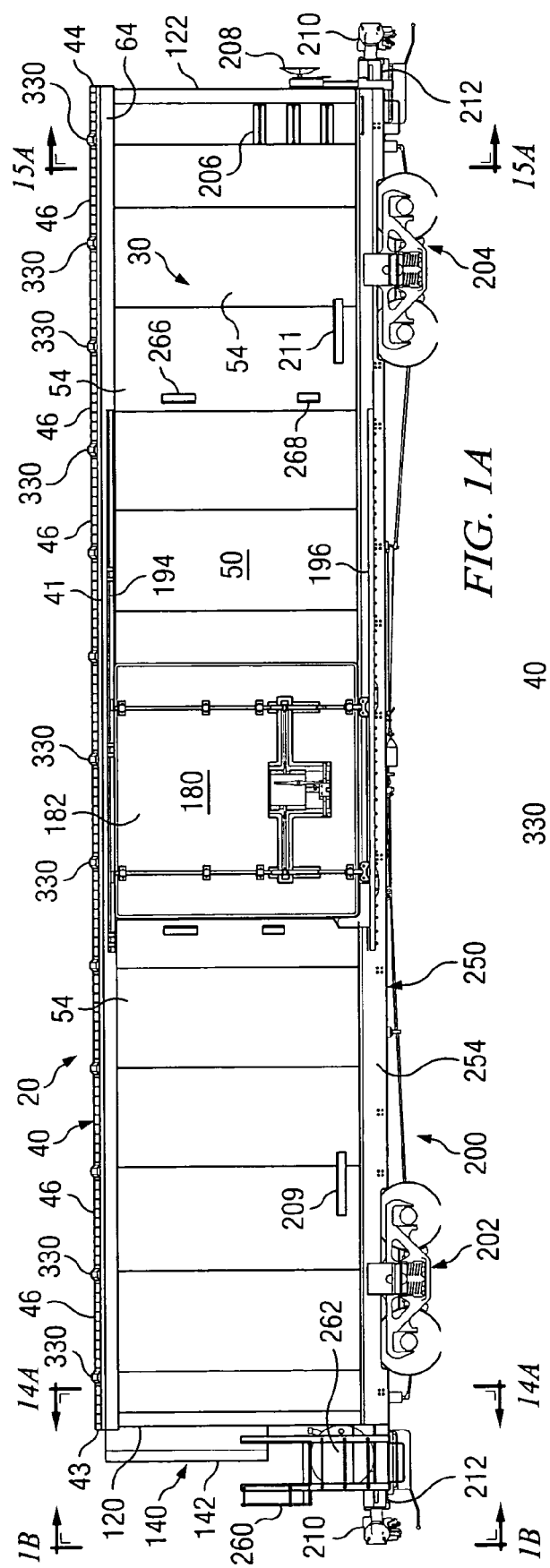
FIG. 1A is a schematic drawing in elevation showing a side view of a temperature controlled railway car having a composite box structure with a temperature control system and an airflow management system incorporating teachings of the present invention.
Figure 1B:
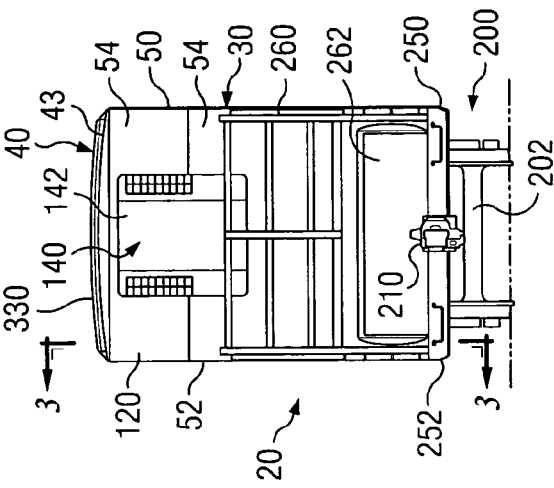
FIG. 1B is an end view of the temperature controlled railway car of FIG. 1A.

Temperature controlled railway car 20 incorporating teachings of the present invention is shown in FIGS. 1A and 1B with composite box structure 30 mounted on railway car underframe 200. As discussed later in more detail, temperature controlled railway car 20 may include temperature control system 140 and airflow management system 300.

Temperature controlled railway car 20 may have exterior dimensions which satisfy requirements of Plate F and associated structural design requirements of the Association of American Railroads (AAR). However, railways cars incorporating teachings of the present invention may have exterior dimensions which satisfy other AAR Plates and associated structural design requirements. The present invention is not limited to AAR Plate F.

Forming various components of composite box structure 30 in accordance with teachings of the present invention and assembling these components on railway car underframe 200 results in reducing the weight of temperature controlled railway car 20 while at the same time increasing both internal volume and load carrying capacity as compared to more conventional refrigerated boxcars satisfying Plate F requirements. A composite box structure and associated insulated boxcar or temperature controlled railway car may be formed in accordance with teachings of the present invention to accommodate various geometric configurations and load carrying requirements to meet specific customer needs concerning size and temperature specifications of different types of lading carried in the resulting boxcar.

The term "composite box structure" refers to a generally elongated structure having a roof assembly, a floor assembly, a pair of sidewall assemblies, and a pair of endwall assemblies which cooperate with each other to provide a generally hollow interior satisfactory for carrying various types of lading associated with insulated boxcars and refrigerated boxcars. Portions of the roof assembly, floor assembly, sidewall assemblies and/or endwall assemblies may be formed from conventional materials such as steel alloys and other metal alloys used to manufacture railway cars. Portions of the roof assembly, floor assembly, sidewall assemblies and/or endwall assemblies may also be formed from composite materials such as plastic materials, insulating foam, fiber reinforced materials, glass fiber pultrusions and fiber reinforced materials such as ballistic resistant fabrics. Examples of some of the materials used to form a composite box structure incorporating teachings of the present invention are discussed throughout this application.

The term "support post" may be used to refer to side posts, side stakes or other structural components satisfactory for use in forming a sidewall assembly incorporating teachings of the present invention. The term "end beam" may be used to refer to I beams or other structural components satisfactory for use in forming an endwall assembly incorporating teachings of the present invention. For some applications support posts and end beams may be formed from metal I beams having similar cross sections. However, support posts and end beams may have a wide variety of other cross sections and may be formed from a wide variety of materials.

The term "FRP" may be used to refer to both fiber reinforced plastic and glass fiber reinforced plastic. A wide variety of fibers in addition to glass fibers may be satisfactory used to form portions of a composite box structure incorporating teachings of the present invention. FRP materials are examples of fiber reinforced materials which may be used to form a railway car in accordance with teachings of the present invention.

The term "insulating materials" may include urethane foam, closed cell urethane foam, polyvinyl chloride materials, polycarbonate materials, urethane foam blocks, and any other material having satisfactory heat transfer characteristics and structural strength for use in manufacturing a railway car incorporating teachings of the present invention.

Composite box structure 30 may be formed from several major components including roof assembly 40, sidewall assemblies 50 and 52, floor assembly 80 and endwall assemblies 120 and 122. Major components associated with composite box structure 30 may be fabricated individually in accordance with teachings of the present invention and then attached to or assembled on railway car underframe 200 to form temperature controlled railway car 20. Individually manufacturing or fabricating major components of composite box structure 30 allows optimum use of conventional railcar manufacturing techniques. For example, side stakes and door posts may be welded with top cords and bottom chords or side sill assemblies using conventional railcar manufacturing techniques to provide structural members for a sidewall assembly.

For some applications, roof assembly 40, sidewall assemblies 50 and 52, floor assembly 80, and/or endwall assemblies 120 and 122, and/or railway car underframe 200 may be fabricated at the same facility. For other applications one or more of these components may be fabricated at a remotely located facility and shipped to another facility to complete fabrication of railway car 20.

Manufacturing procedures associated with plastic materials and foam insulation may be modified in accordance with teachings of the present invention to form various portions of composite box structure 30. For example, sidewall assemblies and endwall assemblies may be formed with relatively thick insulating materials disposed between exterior side sheets and a layer of fiber reinforced plastic by injecting liquid insulating foam therebetween. Support posts and/or end beams may also be disposed between and attached to adjacent portions of the side sheets and associated layer of fiber reinforced plastic. A composite box structure formed in accordance with teachings of the present invention will often provide improved heat transfer characteristics as compared with conventional insulated boxcars and conventional refrigerated boxcars.

For embodiments of the present invention such as shown in FIGS. 1A, 1B, 2, 3, 9A, 9B, 14A, 14B, 15A and 15B portions of railway car underframe 200 may be manufactured and assembled using conventional railcar manufacturing procedures and techniques. Railway car underframe 200 may be mounted on a pair of railway car trucks 202 and 204 located proximate each end of railway car underframe 200. Hand brake 208 and accessories may be included as part of railway car underframe 200. Standard railcar couplings 210 may also be provided at each end of railway car underframe 200. Each coupling 210 may include respective end of car cushioning unit 212 disposed at each end of center sill 214. Brackets 209 and 211 may be mounted on the exterior of sidewall assemblies 50 and 52 for use in opening and closing door assemblies 180.

Figure 2:
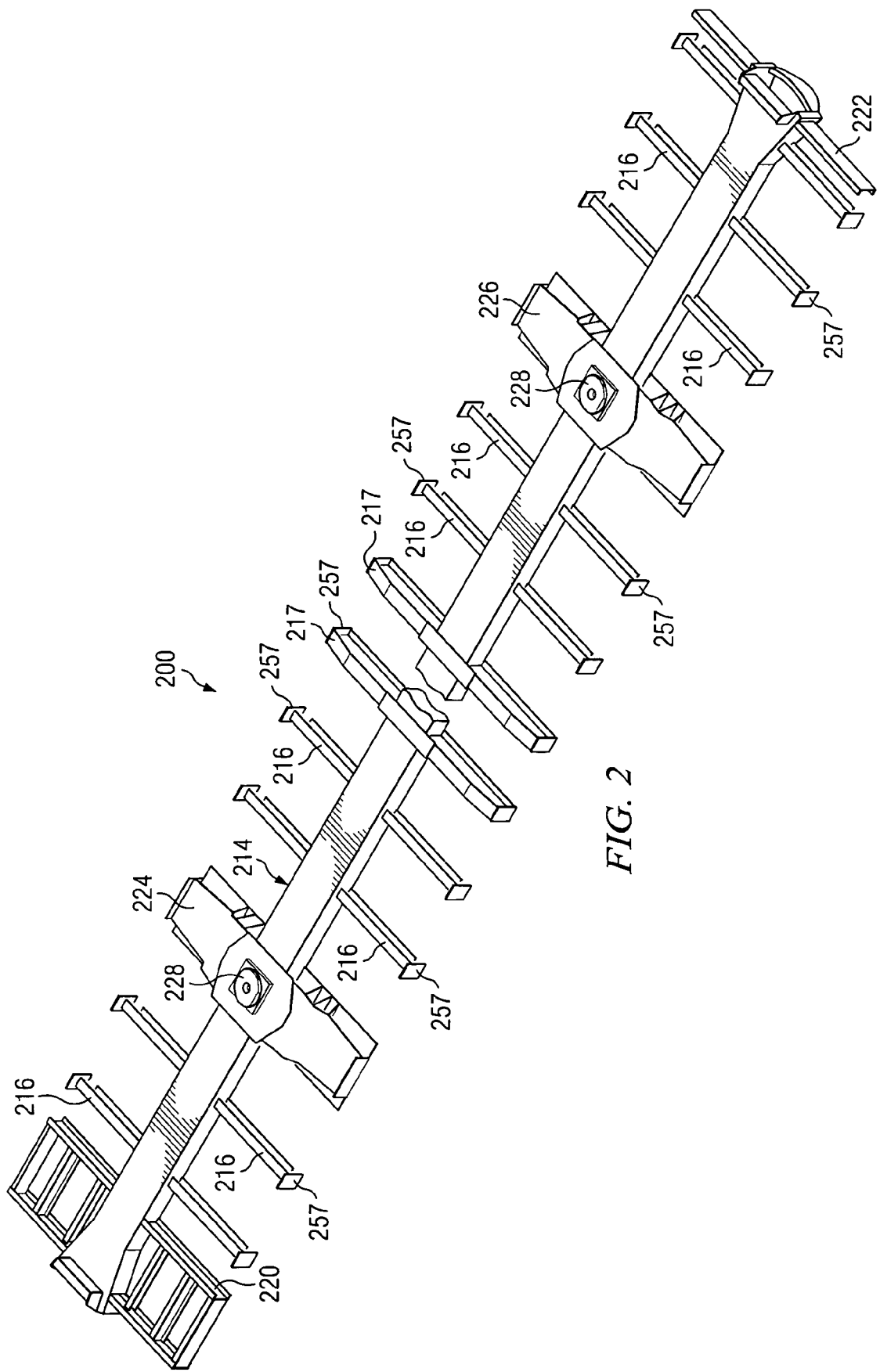
FIG. 2 is a schematic drawing showing an isometric view with portions broken away of a railway car underframe satisfactory for use with a composite box structure incorporating teachings of the present invention.

As shown in FIG. 2 railway car underframe 200 may include center sill 214, cross ties 216, cross bearers 217 and body bolsters 224 and 226 arranged in a generally rectangular configuration. Body bolsters 224 and 226 may be disposed on respective railway trucks 202 and 204. Body bolsters 224 and 226 extend laterally from center sill 214.

Each body bolster 224 and 226 may include respective center plates 228. Cross ties 216, cross bearers 217 and body bolsters 224 and 226 may sometimes be referred to as "cross members."

Cross ties 216 and cross bearers 217 may be attached to and extend laterally from center sill 214. For some applications railway car underframe 200 may also be initially manufactured with side sill assemblies 250 and 252 attached with respective cross ties 216, cross bearers 217 and body bolsters 224 and 226. During manufacture of sidewall assemblies 50 and 52, side sill assemblies 250 and 252 may be removed from railway car underframe 200 and integrated into respective sidewall assemblies 50 and 52. See for example, FIG. 5.

Respective plates 257 may be disposed on the extreme ends of each cross tie 216 and cross bearer 217. Plates 257 may include openings or holes (not expressly shown) to accommodate bolts or other mechanical fasteners. Plates 257 facilitate removal of side sills 250 and 252 and reattachment of side sills 250 and 252 as integral components of respective sidewall assemblies 50 and 52.

Portions of floor assembly 80 may be disposed on center sill 214, cross ties 216, cross bearers 217 and body bolsters 224 and 226. Portions of floor assembly 80 may also be disposed on portions of end sill assemblies 220 and 222 and portions of side sill assemblies 250 and 252. See FIGS. 3, 5, 9A, 9B, 10A, 10B, 14A–C and 15A–B. The number of cross ties 216 and cross bearers 217 may be varied depending upon the desired load carrying characteristics for the resulting railway car 20. Portions of floor assembly 80 may be adhesively bonded with portions of railway car underframe 200.

Sidewall assemblies 50 and 52 may be fabricated with side sill assemblies 250 and 252 formed as integral components thereof. Endwall assemblies 120 and 122 may also be formed with respective bottom plates 124 satisfactory for mounting on respective end sills 220 and 222.

As shown in FIGS. 1A and 1B refrigeration unit 142 may be mounted on endwall assembly 120 of composite box structure 30. Refrigeration unit 142 may be mounted on the exterior of endwall assembly 120 and partially disposed within opening 227 of endwall assembly 120. See FIGS. 14A and 16. End platform 260 may be mounted on railway car underframe 200 near refrigeration unit 142 to provide easy access to refrigeration unit 142. External fuel tank 262 may be located on end platform 260 proximate refrigeration unit 142. End platform 260 provides convenient access to both fuel tank 262 and refrigeration unit 142.

Sidewall assemblies 50 and 52 may have substantially the same configuration and overall design. For some applications ladder 206 may be disposed within exterior portion of sidewall assemblies 50 and 52. See FIG. 1A. For other applications a ladder may be formed as part of railway car underframe 200 (not expressly shown). Sidewall assemblies 50 and 52 preferably include respective openings 36 with respective door assemblies 180 slidably mounted thereon. See FIGS. 1A, 3 and 19. Each door assembly 180 has a first position blocking respective opening 36 to form a barrier between interior 32 and the exterior of composite box structure 30. See FIG. 1A. Each door assembly 180 also has a second position which allows access to interior 32 of composite box structure 30 through respective opening 36.

Various features of the present invention may be discussed with respect to sidewall assembly 52 such as shown in FIGS. 3, 4, 5 and 7. Sidewall assembly 50 may include the same features. Sidewall assembly 52 may have a plurality of metal sheets or side sheets 54 disposed on the exterior thereof. Side sheets 54 cooperate with each other to form exterior surfaces of sidewall assembly 52 and composite box structure 30. A plurality of side stakes or support posts 56 may be attached to interior surface 55 of each side sheet 54. Support posts 56 project toward interior 32 of composite box structure 30.

For some embodiments each support post 56 may have the general cross section of an I-beam defined in part by web 56a and flanges 56b and 56c. See FIGS. 5 and 7. Flange 56b includes exterior surface 59 of each post 56. Flange 56c includes interior surface 57 of each post 56.

Figure 7:
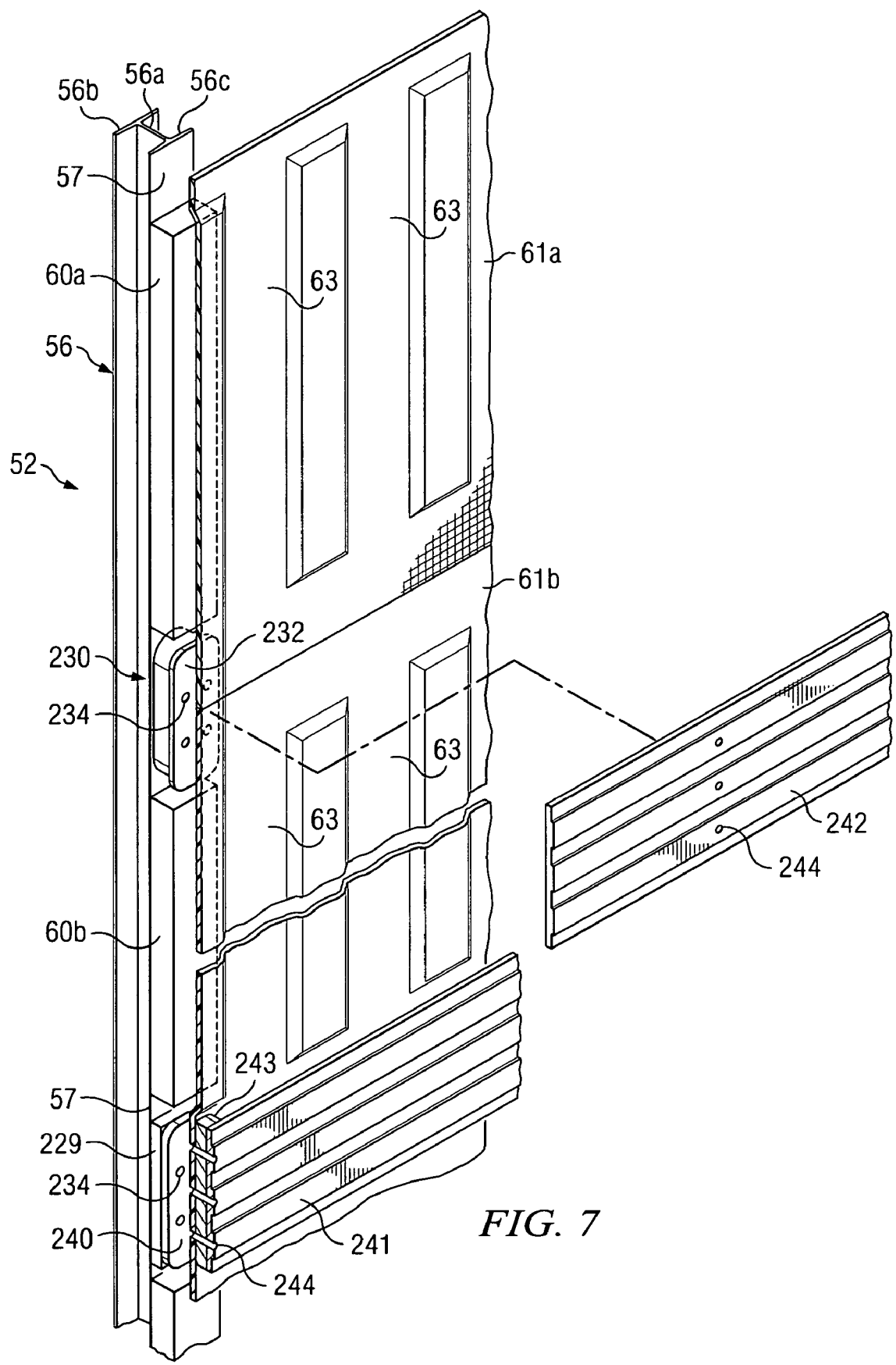
FIG. 7 is a schematic drawing showing an exploded isometric view with portions broken away of a sidewall assembly and associated isolator assemblies satisfactory for mounting scuff plates on the sidewall assembly.
Figure 9B:
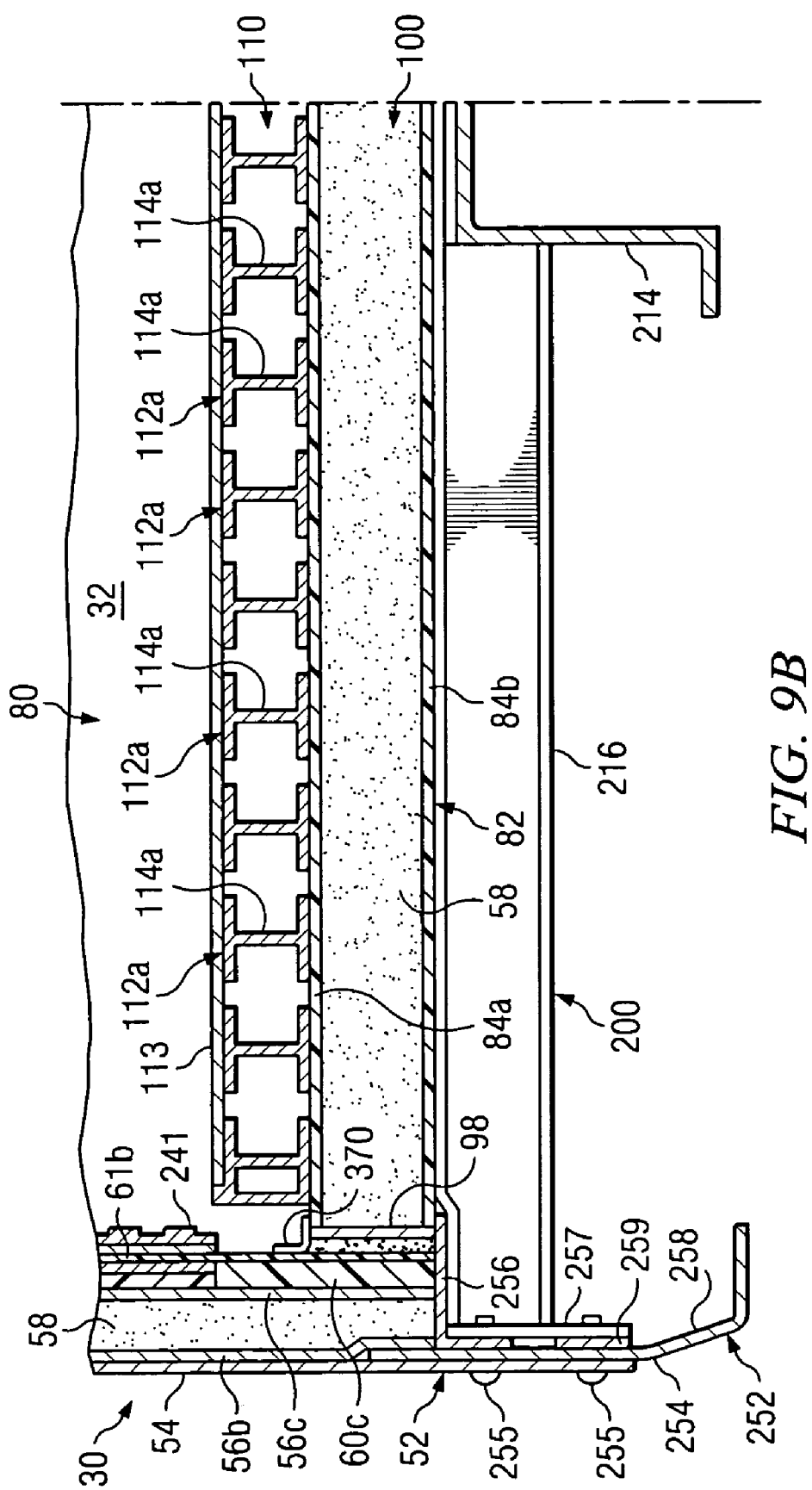
FIG. 9B is a schematic drawing in section with portions broken away taken along lines 9B—9B of FIG. 8 showing another view of a sidewall assembly and a floor assembly mounted on a railway car underframe in accordance with teachings of the present invention.

For some applications, isolators 60 may be formed from strips of thermoplastic polymers such as polyvinyl chloride (PVC) insulating material and attached to interior surface 57 of support posts 56. For other applications isolators 60 may be formed from urethane foam blocks or other insulating materials and attached to interior surface 57 of support post 56. For applications such as shown in FIGS. 5 and 7, first isolator 60a, second isolator 60b, and third isolator 60c may be formed from blocks of urethane foam and securely bonded with interior surface 57 of associated support post 56. Urethane foam blocks may sometimes be described as a "semi-structural material". Urethane foam blocks may have better insulation characteristics as compared with polyvinyl chloride insulating materials but may also have reduced structural strength as compared with polyvinyl chloride blocks. Various insulating materials may be attached to interior surface 57 of support posts 56. The present invention is not limited to use of PVC strips, PVC blocks or urethane foam blocks.

As shown in FIGS. 5, 6 and 7 isolators 60a and 60b and scuff plate support 230 may be attached to interior surface 57 of each support post 56 with scuff plate support 230 disposed between associated isolators 60a and 60b. Isolator 60c and scuff plate support 229 may also be attached to interior surface 57 of each support post 56 with scuff plate support 229 disposed between isolators 60b and 60c. See FIG. 5. As discussed later in more detail, scuff plate supports 229 and scuff plate supports 230 may be used to attach scuff plates 241 and 242 with interior portions of sidewall assemblies 50 and 52. Scuff plate support 230 may also be referred to as "support assembly 230". Scuff plate support 229 may also be referred to as "support block 229".

Layers 61 of fiber reinforced material may be disposed on and attached to isolators 60. See FIGS. 4, 5 and 7. Foam insulation 58 or other suitable insulating materials may be disposed between adjacent sides posts 56 and bonded with interior surface 55 of side sheets 54, the interior surface of layers 61 and adjacent portions of support posts 56. For some applications a layer of scrim (not expressly shown) may be attached to the interior surface of each layer 61 to enhance bonding with foam insulation 58. The scrim may be a nonwoven fabric or any other suitable material for bonding with foam insulation 58. Adhesion between foam insulation 58 and the interior surface of layers 61 will securely bond layers 61 with sidewall assembly 52. However, layers 61 may be nailed and/or adhesively bonded with isolators 60 if desired.

Layers 61 associated with sidewall assemblies 50 and 52 preferably may include a corrugated cross section which provides recessed portions or channels 63 disposed between adjacent support posts 56. For some applications channels 63 may have a depth of approximately one-half of one inch (½"). The corrugated cross section of layers 61 and channels 63 form portions of airflow management system 300.

Layers 45 associated with roof assembly 40 and layers 128 associated endwall assemblies 120 and 122 may be formed from the same material as layer 61. See FIGS. 14A and 14B. However, layers 45 and 128 will generally not include any corrugations or channels 63. Adhesion between foam insulation 58 and adjacent portions of layers 45 and 128 may be satisfactorily used to securely bond layers 45 with roof assembly 40 and layers 128 with endwall assemblies 120 and 122. For some applications layers 61 with corrugations 63 may be attached to interior surfaces of each door assembly 180.

Layers 45, 61 and 128 may be formed from tough, lightweight, relatively rigid material having high impact resistance available from U.S. Liner Company, a division of American Made, Inc. under the trademark Bulitex. Bulitex material may be generally described as a ballistic grade composite scuff and wall liner.

Various types of ballistic resistant fabric may also be satisfactorily used to provide layers 45, 61 and 128 for a composite box structure incorporating teachings of the present invention. Ballistic resistant fabrics may be formed with multiple layers of woven or knitted fibers. The fibers may be impregnated with low modulus elastomeric material as compared to the fibers which preferably have a high modulus. U.S. Pat. No. 5,677,029 entitled "Ballistic Resistant Fabric Articles" and assigned to Allied Signal shows one example of a ballistic resistant fabric.

Figure 3:
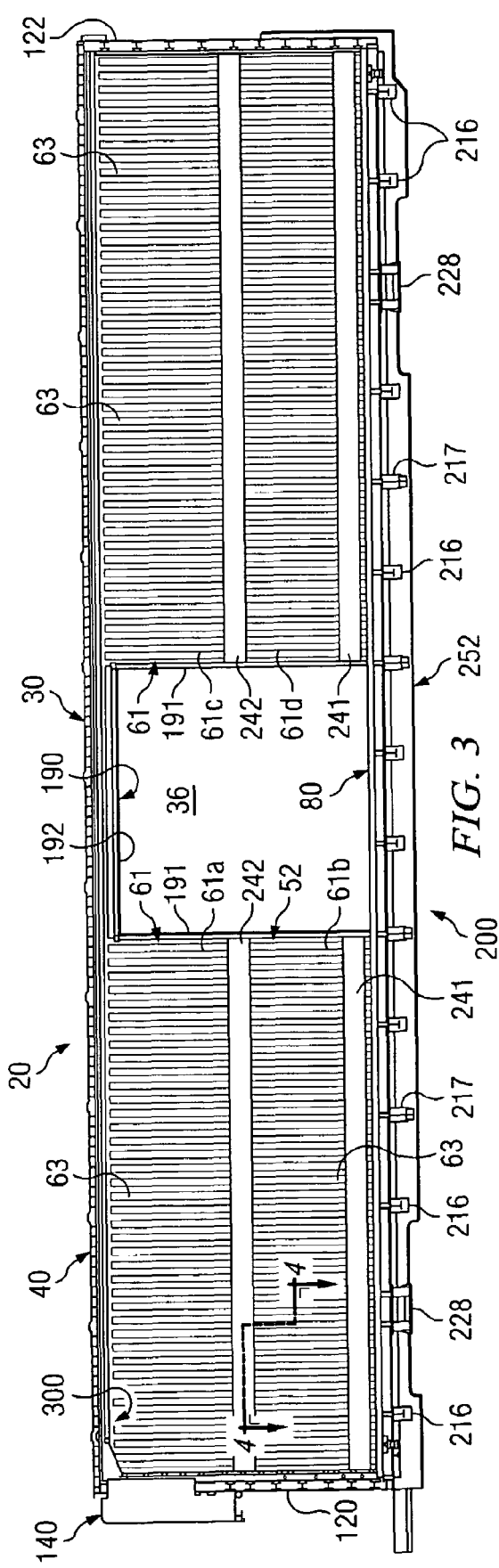
FIG. 3 is a schematic drawing in section with portions broken away showing an interior view of a composite box structure incorporating teachings of the present invention taken along lines 3—3 of FIG. 1B.
Figure 4:
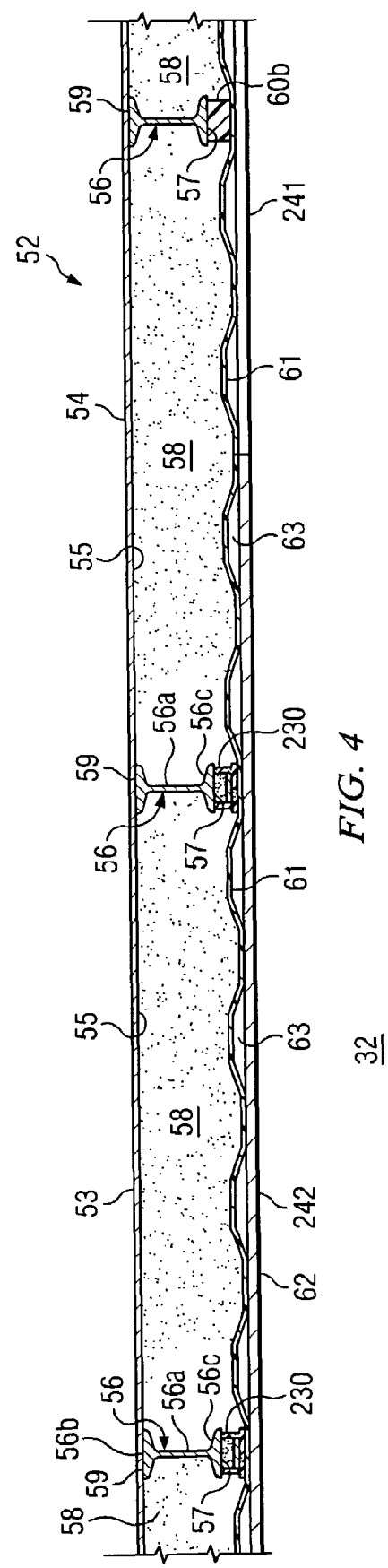
FIG. 4 is a schematic drawing in section with portions broken away taken along lines 4—4 of FIG. 3 showing portions of a sidewall assembly incorporating teachings of the present invention.

For some applications layer 61 may be applied to interior portions of sidewall assembly 52 in multiple segments or strips. For example as shown in FIG. 3, sidewall assembly 52 may be fabricated with upper horizontal strip or a first segment 61a attached to interior portions of sidewall assembly 52 adjacent to roof assembly 40 extending from endwall assembly 120 to door opening 36. Lower horizontal strip or second segment 61b may be attached to interior portions of sidewall assembly 52 adjacent to floor assembly 80 extending from endwall assembly 120 to door opening 36. In a similar manner upper horizontal strip or third segment 61c may be attached to interior portions of sidewall assembly 52 adjacent to roof assembly 40 extending from endwall assembly 122 to door opening 36. Lower horizontal strip or fourth segment 61d may be attached to interior portions of sidewall assembly 52 adjacent to floor assembly 80 extending from endwall assembly 122 to door opening 36. Generally vertical corrugations 63 may be formed in each horizontal strip 61a, 61b, 61c and 61d.

For embodiments such as shown in FIGS. 3, 5, 7, 9A and 9B first scuff plate 241 may be disposed on the interior of sidewall assembly 52 proximate floor assembly 80. Second scuff plate 242 may be disposed on the interior of sidewall assembly 52 between floor assembly 80 and roof assembly 40. Scuff plates 241 and 242 may be installed in segments with a first segment extending from endwall assembly 120 to associated door opening 36 and a second segment extending between associated door opening 36 and endwall assembly 122. Scuff plates 241 and 242 may be formed from aluminum alloys or any other material having desired wear characteristics to minimize damage to interior surfaces of associated sidewall assemblies 50 and 52. For some applications, respective scuff plates 242 may be located proximate or covering longitudinal seams between horizontal strips 61a and 61b and horizontal strips 61c and 61d.

A plurality of support blocks 229 may be mounted on interior surface 57 of each support post 56. The location of support blocks 229 may be selected to correspond with the desired location for each scuff plate 241 relative to floor assembly 80. A plurality of support assemblies 230 may be mounted on interior surface 57 of each support post 56. The location of support assemblies 230 may be selected to correspond with the desired location for each scuff plate 242 relative to associated scuff plate 241 and floor assembly 80.

Scuff plates 241 and 242 may be directly attached with adjacent portions of support posts 56. However, mechanical fasteners extending directly between scuff plate 241 and/or scuff plate 242 and adjacent support posts 56 may create significant thermal shorts allowing increased heat transfer between the interior and exterior of associated composite box structure 30. Therefore, support blocks 229 and support assemblies 230 will often be used to attach scuff plates 241 and 242 with support posts 56 to minimize transfer of thermal energy between the interior and the exterior of composite box structure 30.

Each support assembly 230 preferably includes housing 232 which may be formed from various types of plastic materials having both desired structural strength and heat transfer characteristics. Polycarbonate materials may be used for some embodiments. A plurality of holes 234 may be formed in housing 232 and associated flange 56c of support post 56 at the desired location for attachment of scuff plate 242. Cavity 231 may be formed in housing 232 and sized to receive attachment plate 238. Isolator 236 may also be disposed in cavity 231 of housing 232 after inserting attachment plate 238.

Urethane foam blocks or other types of insulating material may be satisfactorily used to form isolator 236. For some applications urethane foam may be sprayed into cavity 231 after inserting attachment plate 238 to form isolator 236. Attachment plate 238 may be formed from aluminum alloys or any other material satisfactory for engagement with blind bolts or screws.

Support assembly 230 is designed to minimize transfer of thermal energy between scuff plate 242 and associated posts 56 while at the same time providing desired structural strength for attachment of scuff plate 242. Polycarbonate materials may be used to form housing 232 to provide both optimum thermal resistance and optimum structural strength. The configuration of cavity 231 may be selected to also provide optimum structure strength and optimum resistance to thermal energy transfer between posts 56 and scuff plate 242. Blind bolts or screws (not expressly shown) may be inserted through openings 234 in housing 232 and corresponding holes 234 in associated post 56 to securely engage support assemblies 230 at desired locations on each posts 56.

The dimensions associated with support assemblies 230 may be selected to allow airflow to continue from channel 63 in layer 61a into corresponding channels 63 formed in layer 61b. The present invention is not limited to support assemblies having configurations such as shown in FIGS. 6 and 7. Cavity 231, isolator 236 and attachment plate 238 may be formed with a wide variety of configurations and dimensions. Various types of mechanical fasteners such as bolts, screws and/or HUCK® fasteners may be inserted through holes 234 in housing 232 and associated holes (not expressly shown) in flange 56c to securely engage support assembly 230 at the desired location on each support post 56.

After sidewall assemblies 50 and 52 have been securely mounted on railway car underframe to form composite box structure 30, scuff plate 242 may be attached to associated support assemblies 230. Bolts, screws or HUCK fasteners may be inserted through openings 244 to engage attachment plate 238 disposed within housing 232. Housing 232 and isolator 236 substantially reduce any heat transfer which may occur between scuff plate 242 and adjacent support post 56.

Support blocks 229 and attachment plates 240 may be securely disposed between isolators 60b and 60c. Holes 234 may be formed in attachment plate 240. For some applications support blocks 229 may be formed from PVC foam. Support blocks 229 may be bonded with flange 56c using various types of adhesives. Various types of mechanical fasteners such as screws or HUCK fasteners may be inserted through openings 234 to securely engage attachment plates 240 with support posts 56. Various types of mechanical fasteners may be inserted through openings 244 in scuff plate 241 to securely engage scuff plate 241 with attachment plates 240.

For some applications scuff plate 241 may be directly disposed on layers 61b and securely engaged with attachment plates 240. For other applications spacers 243 may be attached to scuff plates 241. Spacers 243 may be used to provide an offset from scuff plate 241 and adjacent layer 61b to accommodate airflow therebetween. Additional spacers 243 may be attached to scuff plate 241 to contact layer 61b opposite adjacent support posts 56. See FIG. 5. For some applications spacers 243 may be disposed on scuff plates 241 at a distance of approximately fifteen inches from each other.

For some applications corrugations formed in segments 61b and 61d may extend along substantially the full height of each layer 61b and 61d from floor assemblies 80. For other applications such as shown in FIG. 7 the corrugations in segments 61b and 61d may terminate at a location above associated scuff plate 241. The configuration and dimensions associated with support block 229 and attachment plate 240 and the use of spacer 243 may be varied depending on the configuration of corrugations in associated layers 61b and 61d.

For some applications layers 61 may be formed from fiber reinforced material having corrugations or channels 63 disposed therein. Upper layers such as 61a or 61c may have generally rectangular configurations. Upper and lower portions of layers 61a and 61c may be relatively flat with corrugations 63 space therefrom. Lower layers such as 61b and 61d may have a similar length but a reduced width. Also, the length of corrugations 63 in layers 61b and 61d may be substantially reduced as compared with the length of the corrugations 63 in layers 61a and 61c. For one application upper layers 61a and 61c may have an overall length of approximately three hundred seventy eight inches, a width of approximately ninety eight inches and a thickness of approximately 0.08 inches.

For one application side sheets 54 may be formed from twelve (12) gauge steel. Support posts 56 may be three (3) inch I-beams. Foam insulation 58 may have a thickness of approximately four (4) inches. Layers 61 may be formed from Bulitex material having a thickness of approximately 0.06 to 0.08 inches. The width of corrugations 63 formed in layers 61 may be between approximately four (4) and five (5) inches.

As shown in FIGS. 5, 14A, 15A, 18 and 19, sidewall assemblies 50 and 52 preferably include respective top chords 64. Top chords 64 extend longitudinally along the respective upper edge of sidewall assemblies 50 and 52. Top chords 64 may sometimes be referred to as "top plates". Each top chord 64 may have a generally inverted "L-shaped" cross section defined in part by leg 66 and leg 68 extending therefrom. See FIGS. 5, 18 and 19. The upper portion of adjacent side sheets 54 may be attached with leg 66 of each of associated top chord 64. Various techniques such as welding and/or mechanical fasteners may be used to attached side sheets 54 with adjacent portions of top chord 64.

Side sill assemblies 250 and 252 preferably have substantially the same configuration and dimensions. As shown in FIGS. 5, 9A, 9B, 14A and 15A, side sill assemblies 250 and 252 have generally J shaped cross sections. The configuration of exterior surface 254 of side sill assemblies 250 and 252 preferably corresponds with the dimensions of AAR Plate F. Respective support members 256 may be attached to interior surface 258 of side sill assemblies 250 and 252. Support members 256 may extend along substantially the full length of the respective side sill assembly 250 and 252. For some applications support members 256 may be formed from metal angles having desired dimensions compatible with railway car underframe 200 and floor assembly 80.

Spacer 259 may also be disposed on interior surface 258 of each side sill assemblies 250 and 252. The dimensions associated with spacer 259 are preferably selected to be compatible with attachment plates 257 disposed on the extreme end of cross ties 216 and cross bearers 217. For one embodiment sidewall assembly 50 is preferably mounted on one longitudinal edge of railway car underframe 200 with side sill assembly or bottom chord 250 disposed adjacent to respective plates 257 of cross ties 216 and cross bearers 217. In a similar manner sidewall assembly 52 is preferably mounted on an opposite longitudinal edge of railway car underframe 200 with side sill assembly or bottom chord 252 disposed adjacent to respective plates 257 of cross bearers 217 and cross ties. Various types of mechanical fasteners 255 and/or welds may be formed between side sill assemblies 250 and 252 and the respective plates 257. For some applications Huck type mechanical fasteners may be used to attach side sill assemblies 250 and 252 with the respective attachment plates 257 of railway car underframe 200. See FIGS. 9A and 9B.

Endwall assemblies 120 and 122 may be formed using similar materials and techniques as previously described with respect to sidewall assembly 52. For sidewall assembly 52, support posts 56 extend generally vertically between side sill assembly 252 and top chord 64. Endwall assemblies 120 and 122 may be formed with end beams 126 having an I-beam configuration similar to support posts 56. However, end beams 126 disposed within endwall assemblies 120 and 122 extend generally horizontally with respect to each other and railway car underframe 200. See FIGS. 14B and 15B.

End beams 126 may be attached with respective metal sheets 54. Metal sheets 54 of endwall assemblies 120 and 122 may also be referred to as "end sheets" or "side sheets." Respective isolators 60 may be attached to interior surface or first surface 127 of each support beam 126 associated with endwall assembly 122. Layer 128 may also be attached with associated isolators 60 opposite from end sheets 54. Foam insulation 58 may be disposed between and bonded with adjacent portions of end beams 126, interior surface 55 of metal sheets 54 and adjacent portions of layer 128.

For some applications isolators 60 associated with endwall assemblies 120 and 122 may be formed from DIVINYCELL® cellular polyvinyl chloride plastic blocks. DIVINYCELL® blocks are available from Diab AB Corporation located in Sweden. DIVINYCELL® strips may also be placed on end closures or end plates (not expressly shown) attached to opposite ends of end beams 126.

For some embodiments of the present invention respective angles or bottom plates 124 may be formed as integral component of respective endwall assemblies 120 and 122. Respective angles 124 may be securely attached with adjacent metal sheets 54 using conventional welding techniques and bonded with foam insulation 58.

For some applications railway car underframe 200 may include end sill assemblies 220 and 222 having the general configuration of a "C-shaped" channel. The overall length of end sills 220 and 222 extending from center sill 214 and the length of associated angles 124 are preferably selected to be approximately equal with each other and equal to the approximate width of railway car underframe 200. Various welding techniques and/or mechanical fasteners (not expressly shown) may be used to couple bottom plate 124 endwall assemblies 120 and 122 with end sill assemblies 220 and 222. As shown in FIG. 14B endwall assembly 120 may be mounted on the first end of railway car underframe 200 with bottom plate 124 disposed on and attached to respective end sill 220. As shown in FIG. 15B, endwall assembly 122 may be mounted on the second end of railway car underframe 200 with respective bottom plate 124 disposed on and attached to respective end sill 222.

Liquid foam or froth foam may be sprayed into respective joints or connections between sidewall assemblies 50 and 52, endwall assemblies 120 and 122 and roof assembly 40. Trim molding may be placed over respective joints or connections between sidewall assemblies 50 and 52, endwall assemblies 120 and 122 and roof assembly 40. Examples of trim molding 370 are shown in FIGS. 14A, 15A, 18 and 19. Liquid foam or froth foam may be obtained from several vendors including Foam Supply Industries (FSI) and Carpenter Foam Co.

Floor assembly 80 as shown in FIGS. 8, 9A, 93, 10A, 10B and 11 may include primary floor assembly 100 and secondary floor assembly 110. For some applications a plurality of panels 82 may be bonded with each other to form primary floor 100 having a generally rectangular configuration corresponding with desired interior length and width of composite box structure 30. The length of each panel 82 may correspond approximately with the desired interior width of composite box structure 30. The width of each panel 82 may correspond with the lateral spacing between associated cross ties 216 and cross bearers 217 and body bolsters 224 and 226. See FIGS. 9A, 9B, 10A and 10B. U.S. Pat. No. 5,716,487 entitled "Pultrusion Apparatus" assigned to Creative Pultrusions, Inc. describes one example of equipment and procedures which may be used to form panels 82.

For purposes of describing various features of the present invention panels 82 may sometimes be designated as 82a, 82b, 82c, etc. Also, most panels 82 will have approximately the same overall dimensions of length, width and thickness. However, some panels 82 such as panels 82a installed adjacent to endwall assembly 120 and panel 82b installed adjacent to endwall assembly 122 may have modified designs and width to accommodate draining water and other liquids from composite box structure 30.

Panels 82g and 82h disposed over body bolsters 224 and 226 may also have modified designs and width. For example, respective panels 82g and 82h may be disposed upon and bonded with respective portions of each body bolster 224 and 226. For some applications respective panels 82 adjacent to body bolster 224 and 226 may be spaced from each other by a distance of approximately twelve inches to fourteen inches. After the other portions of primary floor assembly 100 have been assembled, respective layers or sheets 84g and 84h may be disposed between adjacent panels 82 and insulating foam injected therebetween to form respective panels 82g and 82h.

For other applications the desired number of panels 82 may be bonded with each other to form primary floor assembly 100 prior to mounting on railway car underframe 200. The complete primary floor 100 may then be lowered onto railway car underframe 200 prior to installing roof assembly 40 on sidewall assemblies 50 and 52 and endwall assemblies 120 and 122. Roof assembly 40 may be mounted on sidewall assemblies 50 and 52 and endwall assemblies 120 and 122 after installation of primary floor 100. For other applications, individual panels 82 or groups of panels 82 such as shown in FIG. 13 may be installed through openings 36 in sidewall assemblies 50 and 52 during assembly of primary floor 100 on railway car underframe 200 after roof assembly 40 has been attached to sidewall assemblies 50 and 52 and endwall assemblies 120 and 122.

As shown in FIGS. 9A 9B, 10A, 10B, 11 and 13, each pultruded panel 82 may include first layer or first sheet 84a and second layer or second sheet 84b with insulating material 58 disposed therebetween. First sheet 84a and second sheet 84b preferably have generally rectangular configurations defined in part by first end 81 and second end 83 with first longitudinal edge 91 and second longitudinal edge 92 extending therebetween. Longitudinal edge 91 of first sheet 84a and longitudinal edge 91 of second sheet 84b may be securely engaged with channel 94a. Longitudinal edge 92 of first panel 84a and longitudinal edge 92 of second panel 84b may also be securely engaged with panel 94b. See FIG. 13. Layers 84a, 84b and associated channels 94 may be formed from fiber reinforced plastic materials using pultrusion technology. Panels 82g and 82h may include only respective first sheets 84a. Panels 82g and 82h may be foamed in place after respective first sheets 84a have been installed of body bolsters 224 and 226.

Figure 10A:
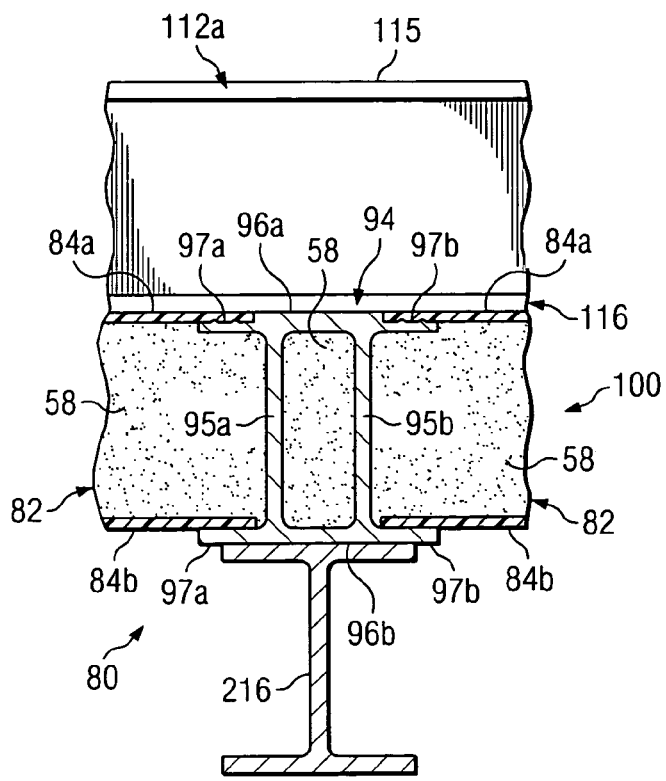
FIG. 10A is a schematic drawing in section with portions broken away taken along lines 10A—10A of FIG. 8.
Figure 10B:
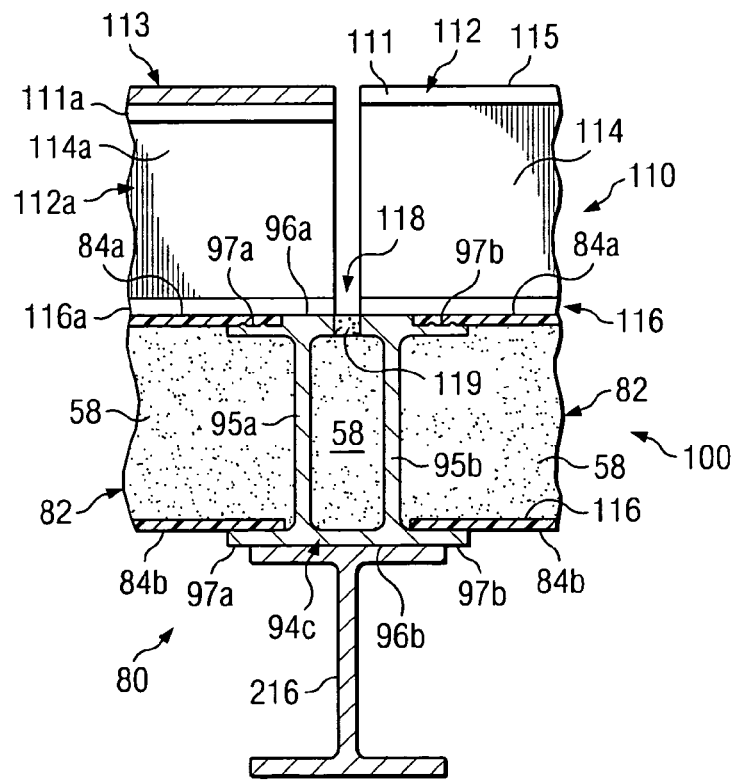
FIG. 10B is a schematic drawing in section with portions broken away taken along lines 10B—10B of FIG. 8.

Channels 94a and 94b may have generally rectangular cross sections defined in part by webs 95a and 95b which are spaced from each other and extend generally parallel with each other along the length of associated panels 92. See FIGS. 10A, 10B and 11. Channels 94a and 94b may also be described as "double web beams" or "hollow beams." Each channel 94 also includes respective flanges 96a and 96b which are spaced from each other and extend parallel with each other along the length of associated panels 92. Webs 95a, 95b and flanges 96a, 96b cooperate with each other to form a generally void space which may be filled with insulating material 58. The length of each pultruded channel 94 corresponds approximately with the desired interior width of composite box structure 30. The width of flanges 96a and 96b may be approximately equal to the width of the associated cross tie 216 or cross bearer 217. FIGS. 10A and 10B.

Channels 94 may be formed by various pultrusion techniques. Pultruded channels 94 provide substantial structural strength for primary floor 100 and transfer weight from lading disposed on floor assembly 80 to railway car underframe 200. Placing pultruded channels or double web beams 94 on the cross members of railway car underframe 200 allows the elimination of longitudinal steel stringers associated with some prior railway cars having composite box structures. Channels 94 increase thermal efficiency of floor assembly 80 and allow reduction in the empty car weight of associated railway car 20 by eliminating multiple webs associated with prior pultruded panels and longitudinal stringers associated with some prior railway car underframes.

First sheet 84a, second sheet 84b and attached channels 94 cooperate with each other to define a void space or cavity which may be filled with insulating material 58 having desired thermal heat transfer characteristics. For some applications, insulating material 58 may be the same as the insulating material used to form sidewall assemblies 150, 152, endwall assemblies 120, 122 and roof assembly 40.

Insulating material 58 substantially reduces heat transfer through floor assembly 80. Various types of insulating material such as closed cell urethane foam may be satisfactorily used to fill void spaces associated with channels 94 and sheets 84a and 84b.

Webs 96a and 96b include respective flanges or lips 97a and 97b which extend laterally therefrom along approximately the full length of associated pultruded panels 84a and 84b. The dimensions and configuration of flanges 97a and 97b are preferably selected to be compatible with receiving longitudinal edges 91 and 92 of first sheet 84a and second sheet 84b to form an associated panel 82.

For some applications flanges 97a and 97b may have a rough surface or serrations of approximately one hundred thirty seconds of an inch (0.032 in.) to improve adhesive bonding between adjacent portions of first layer 84a and second layer 84b with respective flanges 97a and 97b. Various adhesive compounds (not expressly shown) may be used to bond or couple sheets 84a and 84b with associated channels 94 and adjacent pultruded panels 82 with each other.

Respective cover plates or end caps 98 may be placed on ends 81 and ends 83 of panels 84a and 84b to close the cavity formed between layer 84a and 84b and the cavity formed in associated channels 94. Holes 99 may be provided in cover plates 98 to allow injection of liquid foam insulation into associated cavities. Cover plates 98 also prevent moisture or other contaminants from contacting insulating material 58 and reducing associated thermal insulating characteristics. Any moisture or liquids which enter void spaces associated with panels 82 or channels 84 may cause an undesired increase in weight of the associated pultruded panel 82. For some applications cover plates 98 may be formed with a generally rectangular configuration corresponding generally with dimensions of respective ends 81 and ends 83.

Various techniques and procedures may be used to attach or couple primary floor assembly 100 with cross members 216, 217, 224, 226 and/or side sills 250 and 252 and end sills 220 and 222. During loading and unloading of railway car 20, portions of secondary floor 110 may be substantially fully loaded while other portions of secondary floor assembly 110 may be empty or in a no load condition. To prevent tilting or undesired movement secondary floor assembly 110 is preferably bonded with primary floor assembly 100. For some applications biodegradable adhesive compounds may be used to bond or couple pultruded panels 82 with each other, to bond primary floor assembly 100 with railway car underframe 200 or to bond secondary floor assembly 110 with primary floor assembly 100. Also, two-part epoxy adhesives or double epoxy adhesives may be used to bond panels 82 with each other and to bond primary floor assembly 100 with adjacent portions of railway car underframe 200. The same two part epoxy glue may also be satisfactorily used to bond secondary floor assembly 110 with adjacent portions of primary floor 100. One example of an adhesive satisfactory for use in forming floor assembly 80 includes PLIOGRIP® adhesive available from Ashland Chemical.

Pultruded panels 82a and 82b may include one or more drain openings with respective drain plug assembly 106 disposed in respective drain trough or recess 103. Various types of commercially available drain plugs and drain pipes may be satisfactorily used. Drain plug assemblies 106 may be opened to allow cleaning the interior of composite box structure 30. For some applications, drain plug assembly 106 may include plug 104, washer 105, drain pipe 108 and end cap 109. The length of drain pipes 108 may be long enough to extend from respective troughs 103 through panel 82a and 82b and any insulation (not expressly shown) disposed within railway car underframe 200. End cap 109 may be removed and installed while the clean out of railway car 20. For some applications Plug 104 may be formed from PVC foam. Washer 105 may be formed from stainless steel and welded onto stainless steel collar 107. Plug 104 may include threads which releasably engage similar threads (not expressly shown) formed in collar 107. Drain pipe 108 and end cap 109 may be formed from PVC type material. Stainless steel washer 105 may be adhesively bonded with adjacent portions of panel 82b disposed within recess 103.

Placing channels 94 on associated cross members allows reducing the thickness of associated webs 95a, 95b and sheets 84a and 84b. Also, the thickness of foam 58 disposed between sheets or layers 84a and 84b may be increased. As a result the heat transfer rating of floor assembly 80 may be increased while at the same time reducing the overall weight of floor assembly 80 and railway car underframe 200 as compared with railway cars which require the use of longitudinal stringers disposed on associated cross members. Primary floor assembly 100 formed in accordance with teachings of the present invention also eliminate the need to place additional insulating foam within portions of railway car underframe 200 after the assembly of composite box structure 30. The increased thickness of panels 82 eliminates the need for placing additional insulating materials within railway car underframe 200.

FIG. 8 shows a plan view of floor assembly 80 with portions of secondary floor assembly 110 broken away to expose adjacent portions of primary floor assembly 100. For some applications, secondary floor assembly 110 may include a plurality of deck plates 113 installed adjacent to respective openings 36 in sidewall assemblies 50 and 52. See FIGS. 8, 9B and 11. Deck plates 113 may be particularly useful adjacent to openings 36 to accommodate movement of forklifts (not expressly shown) during loading and unloading of railway car 20. Deck plates 113 preferably include rough surface or serrations 115 to provide traction for forklifts or people walking thereon. Deck plates 113 may also include a diamond tread surface.

FIGS. 9A, 9B, 10A, 10B and 11 show portions of secondary floor assembly 110 disposed on primary floor assembly 100 opposite from railway car underframe 200. Secondary floor assembly 110 may be formed by placing a plurality of support beams 112 and 112a on pultruded panels 82 opposite from railway car underframe 200. Beams 112 and 112a preferably disposed normal or perpendicular to associated cross members of railway car underframe 200 and extend longitudinally along the length of floor assembly 80. Beams 112 and 112a are spaced from each other across the width of floor assembly 80.

Support beams 112 and 112a may have configurations or cross sections corresponding with typical I beams. A plurality of deck plates 113 may be disposed on flanges 111a of support beams 112a. For some applications flange 111 of each support beam 112 may have rough surface or serrations 115 to provide traction. Flange 116 of beams 112 and flange 116a of beams 112a may be adhesively bonded or coupled with portions of first layer 84a of adjacent pultruded panels 82.

For embodiments such as shown in FIG. 8, beams 112a may be installed adjacent to openings 36. Web 114a of beams 112a preferably have a reduced height as compared with web 114 of beams 112. The difference in height between webs 114 and webs 114a is selected to be approximately equal to the thickness of deck plates 113. As a result, secondary floor assembly 110, will provide a relatively uniform transition between deck plates 113 and rough surface 115 of adjacent beams 112. See FIG. 11.

Figure 11:
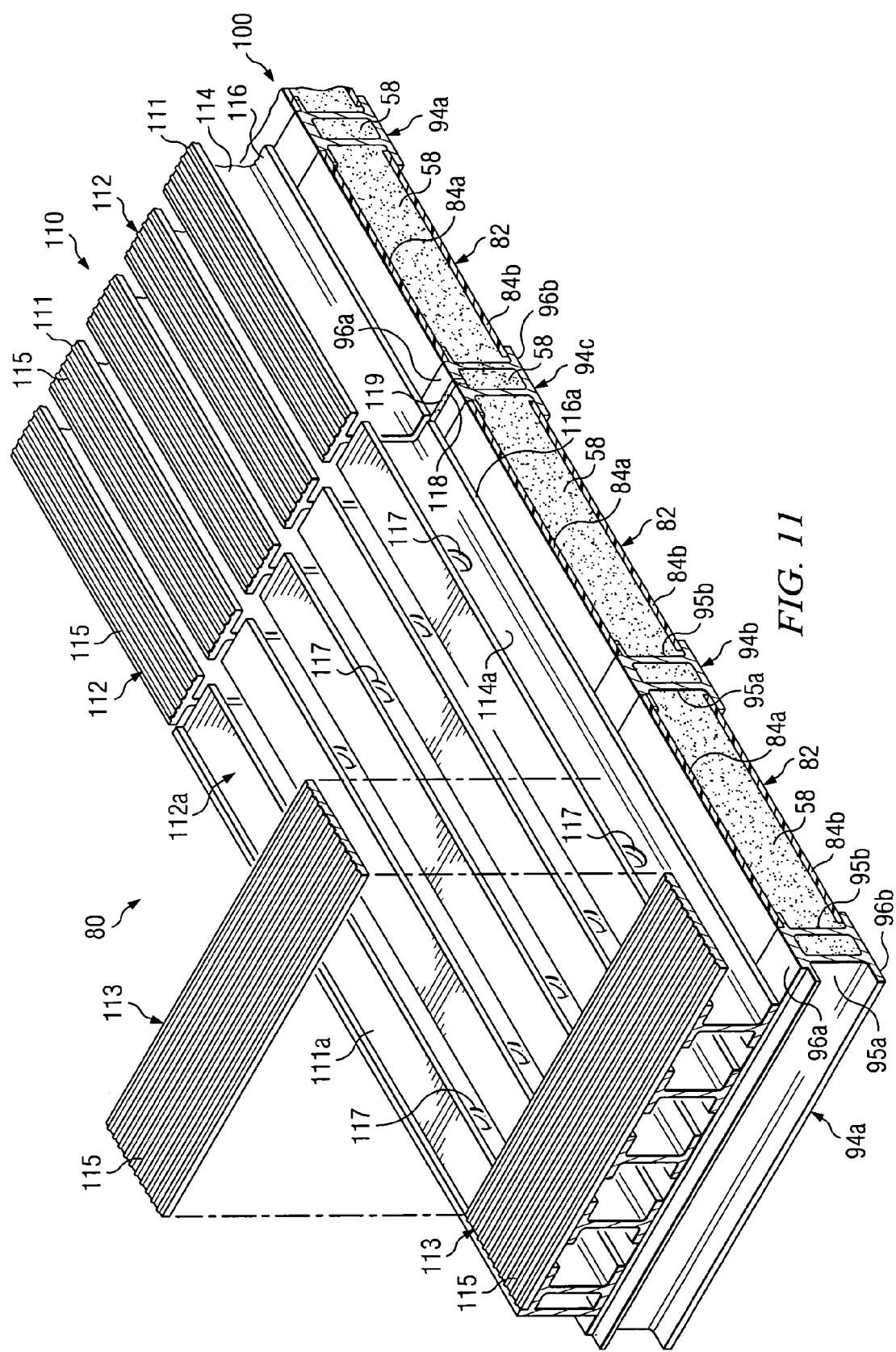
FIG. 11 is a schematic drawing showing an exploded, isometric view with portions broken away of a floor assembly such as shown in FIGS. 10A and 10B.

Deck plates or coverings 113 may be adhesively bonded with flange 111a of support beams 112a. Deck plates 113 may also be mechanically attached to support beams 112a using various types of mechanical fasteners such as blind screws, rivets, and/or HUCK fasteners (not expressly shown). For some applications support beams 112, 112a and deck plates 113 may be formed from metal alloys such as aluminum alloys or other materials typically associated with forming conventional floors in a railway car. As shown in FIG. 11, a plurality of openings 117 may be formed in support beams 112 and 112a. Openings 117 allow airflow or air circulation between primary floor 100 and secondary floor 110.

Floor assembly 80 is preferably formed with pultruded panels 82 extending generally perpendicular or normal to center sill 214. Support beams 112 and 112a are preferably disposed on pultruded panels 82 spaced from each other and extending generally perpendicular or normal to pultruded panels 82. For some embodiments secondary floor 110 may be formed using conventional, metal I beams and conventional deck plating or floor coverings. The alternating configuration of primary floor assembly 100 and secondary floor assembly 110 provides a generally strong, rigid structure with opportunities for cost savings and weight reduction from increased use of composite and thermoplastic materials.

For some applications, one or more expansion joints 118 such as shown in FIGS. 10B and 11 may be formed in primary floor assembly 100. Expansion joints 118 may substantially reduce or eliminate any problems associated with variations in the thermal expansion characteristics of railway car underframe 200, primary floor assembly 100 and secondary floor assembly 110. To compensate for any variations in thermal expansion, slot 119 may be formed in flange 96a of one or more channels 94.

Thermal expansion may be of particular concern since railway car underframe 200 will often be formed from steel alloys, primary floor assembly 100 from fiber reinforced materials and secondary floor assembly 110 from aluminum alloys which each have substantially different thermal expansion coefficients. For some applications, such as a railway car having a nominal length of sixty-four (64) feet, two expansion joints 118 may be formed in primary floor assembly 110. For railway cars having a greater length more expansion joints 118 may be provided.

For embodiments such as shown in FIGS. 10B and 11 channels 94c preferably include respective expansion joint 118. For some applications channels 94c and associated expansion joints 118 may be located at the transition between beams 112a and beams 112 of secondary floor assembly 110. The end of adjacent beams 112a and 112 are preferably disposed adjacent to slot 119 but do not overlap slot 119. See FIGS. 10B and 11. As result of including two expansion joints 118 and a gap between beams 112a and 112, floor assembly 80 may be divided into three components or segments which can expand or contract with respect to each other.

The pultruded materials used to form channels or beams 94c preferably have satisfactory strength to allow flexing of associated webs 95a and 95b during variations in temperature. Flexible caulking material may be disposed in slot 119. Expansion joints 118 may also be particularly important when railway car 20 is manufactured at one temperature and used at a different temperature such as minus twenty degrees Fahrenheit or when railway car 20 is unloaded condition at ambient temperature which can often exceed one hundred fifty degrees Fahrenheit.

Temperature control system 140 preferably includes refrigeration unit or cooling unit 142 and airflow management system 300 which provides uniform, constant airflow around and through lading carried within composite box structure 30. For some applications such as transporting products in sub-zero, winter environments temperature control system 140 may include a heater (not expressly shown). Refrigeration unit 142 may be a self-contained refrigeration unit including a condenser (not expressly shown), airflow blowers (not expressly shown), and a diesel engine (not expressly shown). For some applications, refrigeration unit 142 may provide airflow in the range of 3200 CFM. Self-contained refrigeration unit 142 provides the advantage of easier and faster maintenance as compared to conventional refrigerated boxcars with similar performance characteristics. As a result, temperature control system 140 generally lowers maintenance time and costs and increases the amount of time that temperature controlled railway car 20 remains in service between repairs.

Refrigeration unit 142 may be a programmable unit able to control and maintain desired temperatures within composite box structure 30. Refrigeration unit 142 may include a keypad (not expressly shown) for inputting data for desired system performance and a microprocessor (not expressly shown) to control and monitor the functions and performance of refrigeration unit 142 and temperature control system 140. Refrigeration unit 142 may also include a satellite monitoring and control system (not expressly shown) and/or cellular technology to transmit to remote locations information such as the performance and location of refrigeration unit 142 or the temperature inside composite box structure 30. Various types of refrigeration systems are commercially available from companies such as Thermo King, Carrier and Dring. Such units may be used in motor carrier trailers and other large containers.

Airflow management system 300 provides a relatively uniform distribution of air at a desired temperature throughout the length, width and height of interior 32 of composite box structure 30. Airflow management system 300 allows cooled air to circulate from refrigeration unit 142, around and through products or lading contained within composite box structure 30, and back to refrigeration unit 142 or out of composite box structure 30. Airflow management system 300 may also be capable of circulating fresh air from outside composite box structure 30 or heated air throughout interior portions of composite box structure 30.

Airflow management system 300 preferably includes a number of features which keep products shipped within composite box structure 30 spaced from the interior surfaces of the sidewall assemblies 50 and 52, endwall assemblies 120 and 122, and floor assembly 80 to create openings or gaps for airflow around the product. These features include plenum system 310, secondary floor 110, interior bulkheads or end barriers 280 and 380 and corrugations 63 formed in layers 61.

Interior bulkhead or end barrier 280 may be formed within composite box structure 30 adjacent to endwall assembly 120. See FIGS. 14A, 14B and 16. Interior bulkhead 280 may be formed by attaching a plurality of support beams 284 and 284a and a plurality of pultruded panels 282 with each other in accordance with teachings of the present invention. Various types of supporting structures other than support beams 284 and 284a may be used to attach pultruded panels 282 with adjacent portions of an endwall assembly 120.

For one application, support beams 284 and 284a may have a cross section described as a modified I beam. Support beams 284a may have a reduced length to accommodate opening 127 which provides access to refrigeration unit 142. Support beams 284 and 284a preferably include respective webs 285 and 285a with respective first flange 286 and 286a and respective second flange 287 and 287a attached thereto. First flanges 286 and 286a may be securely attached with adjacent portions end beams 126 of endwall assembly 120 by fasteners 290.

For some applications, the width of second flanges 287 and 287a may be substantially reduced as compared with the width of associated first flange 286 and 286a. The reduced width of first flanges 287 and 287a accommodates the use of mechanical fasteners such as blind screws or Hucks 290 to securely engage respective beams 285 and 285a with end beams 126. A plurality of openings 288 may be formed in webs 285 and 285a to allow circulation of airflow therethrough. Panels 282 may be attached to or mounted on second flange 287 and 287a of support beams 284 and 284a using various techniques such as adhesive bonding or mechanical fasteners.

Panel 282 may be formed from various types of fiber reinforced materials. For some applications panels 282 may be formed from the same Bulitex® materials used to form layers 61 and layers 45. Channels or open beams 294 may be bonded with respective panels 282. For some applications, channels 294 may be described as having a "hat-shaped" cross section. See FIG. 14C. Channels or open beams 294 cooperate with each other to form a grid type structure on support beams 284 and 284a. Channels 294 cooperate with each other to transfer loads from cargo carried within associated composite box structure 30 to support beams 284 and 284a and attached end beams 126.

A plurality of holes or openings 296 may also be formed in each panel 282. The location of holes 296 is preferably selected to correspond with associated second flanges 287 and 287a of post 284 and 284a. Channels 294 may be disposed on panels 282 adjacent to openings 296. Openings 296 and channels 294 cooperate with each other to allow fasteners 292 to be inserted through respective holes 296, channels 294 and securely engaged with flanges 287 and 287a. Channels 292 may be formed from aluminum alloys. Various types of blind bolts, screws and other mechanical fasteners may be satisfactorily used to attach panels 282 with a supporting structure formed in accordance with teachings of the present invention.

Figure 14A:
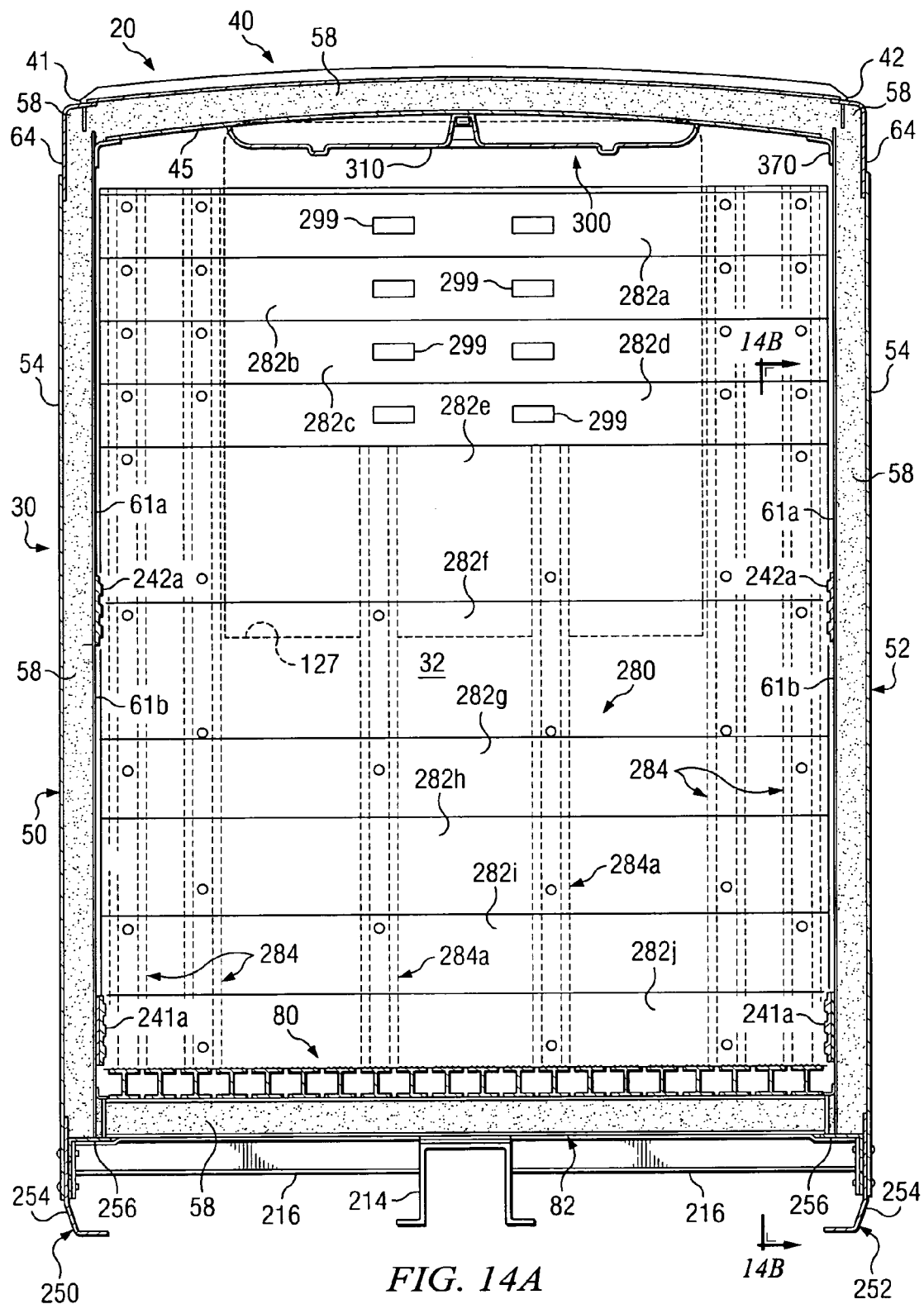
FIG. 14A is a schematic drawing in section and in elevation with portions broken away showing interior portions of the composite box structure of FIG. 1A including a first endwall assembly.
Figure 14B:
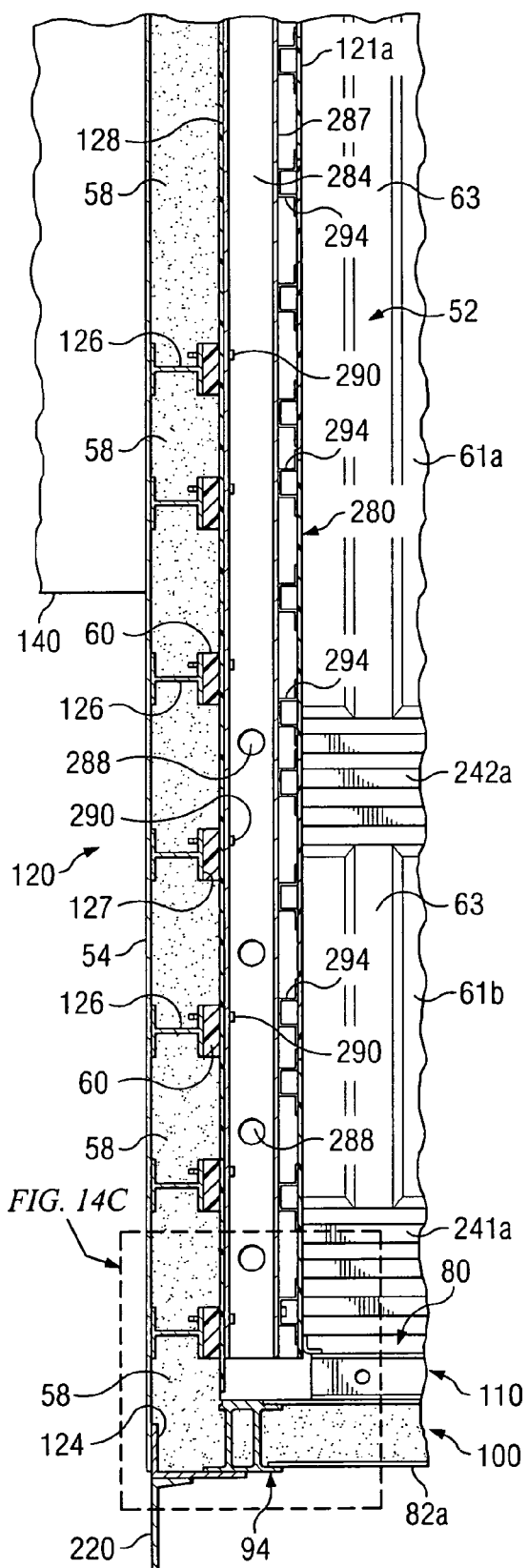
FIG. 14B is a schematic drawing with portions broken away of the first endwall assembly shown in FIG. 14A.
Figure 15B:
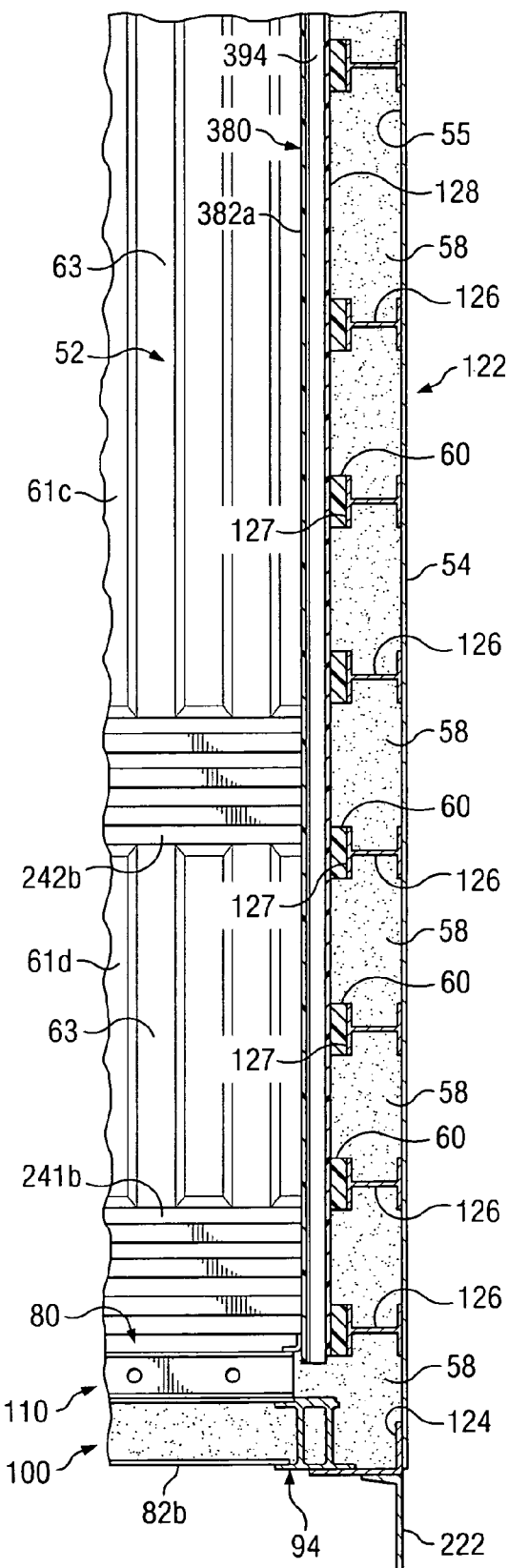
FIG. 15B is a schematic drawing end section and in elevation with portions broken away of the second sidewall assembly of FIG. 15A.
Figure 14C:
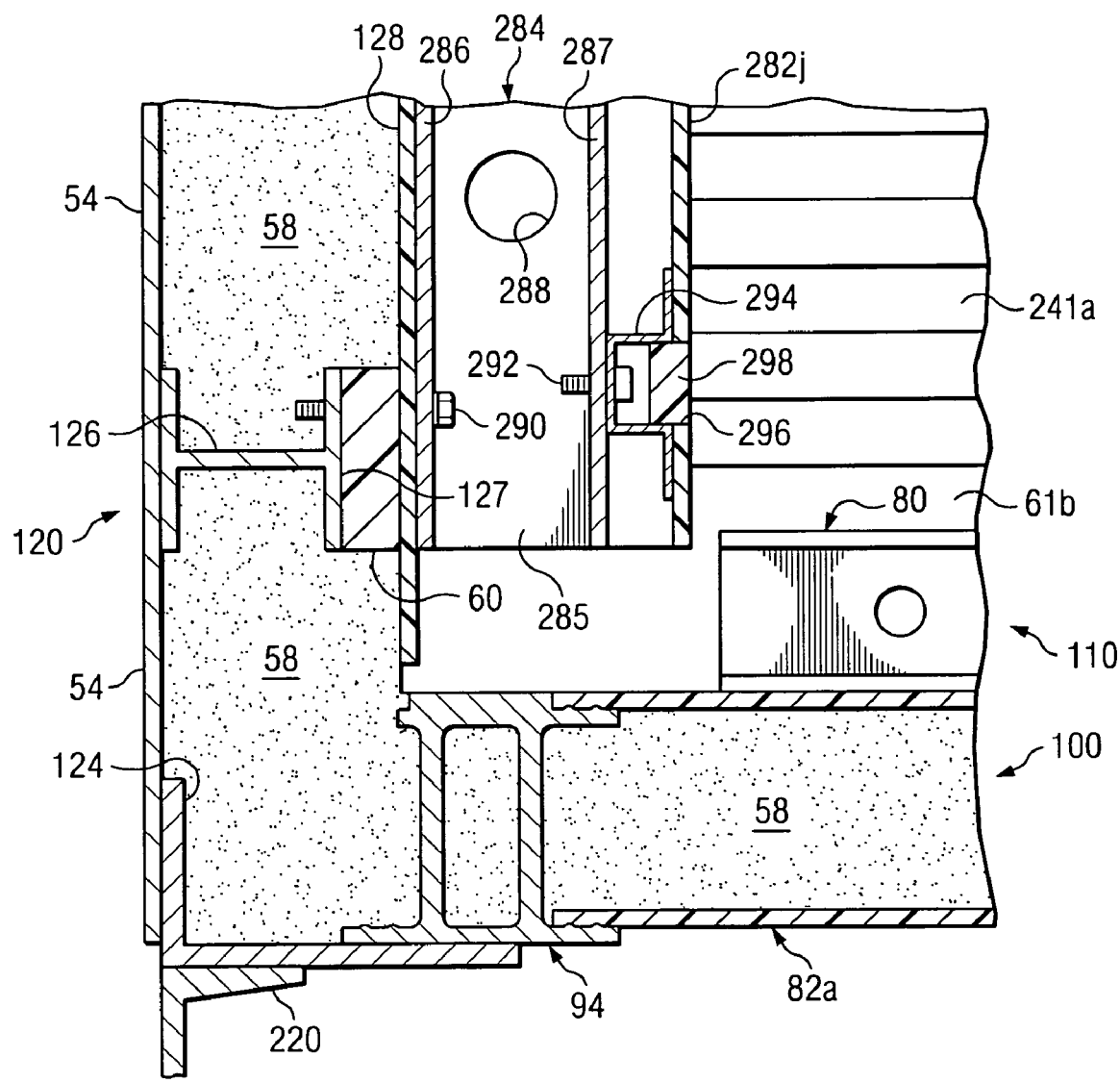
FIG. 14C is an enlarged schematic drawing in section with portions broken away showing attachment between the first endwall assembly and a floor assembly incorporating teachings of the present invention.
Figure 15A:
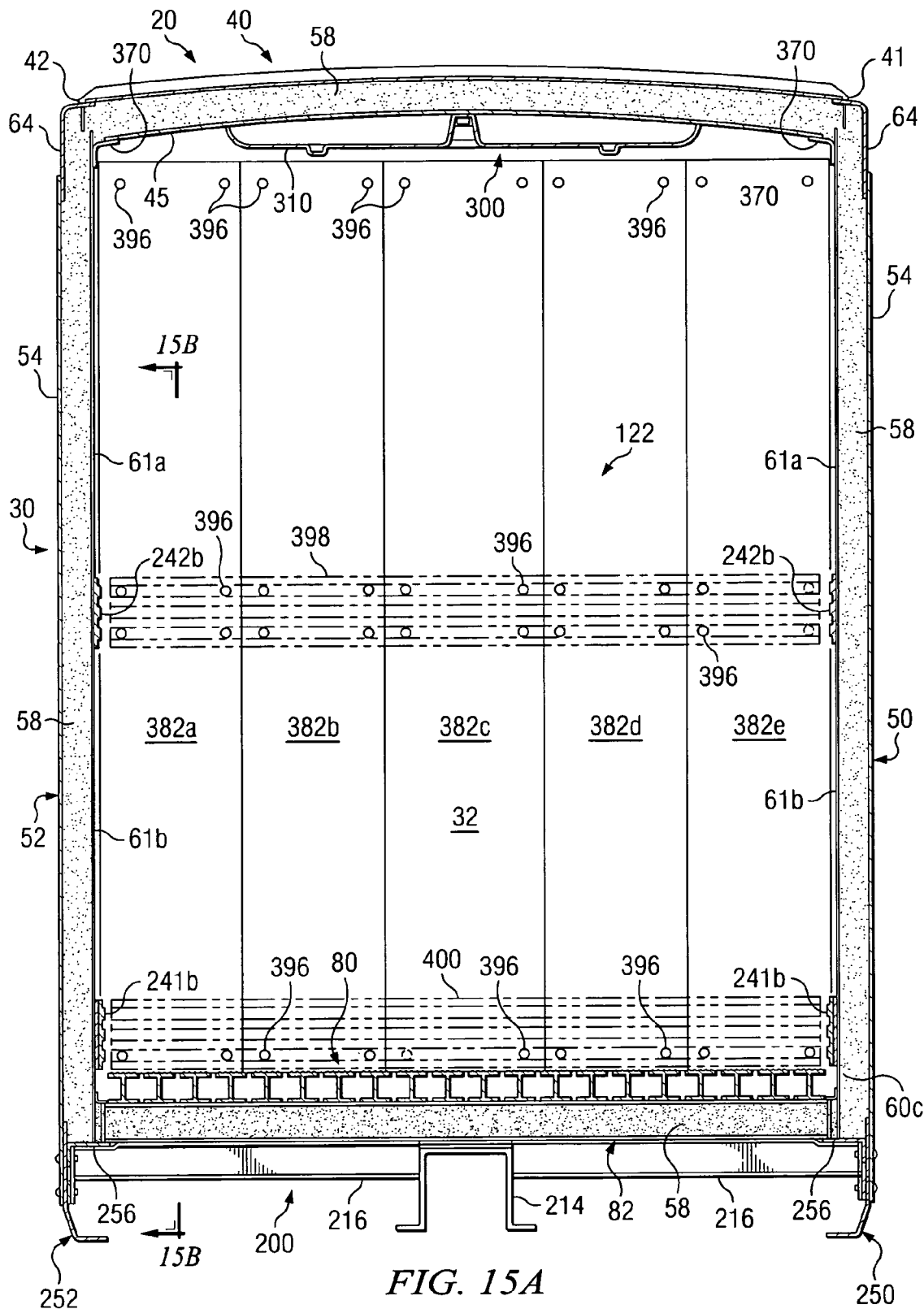
FIG. 15A is a schematic drawing in section and in elevation with portions broken away of showing interior portions of the composite box structure of FIG. 1A including a second endwall assembly.
Figure 16:
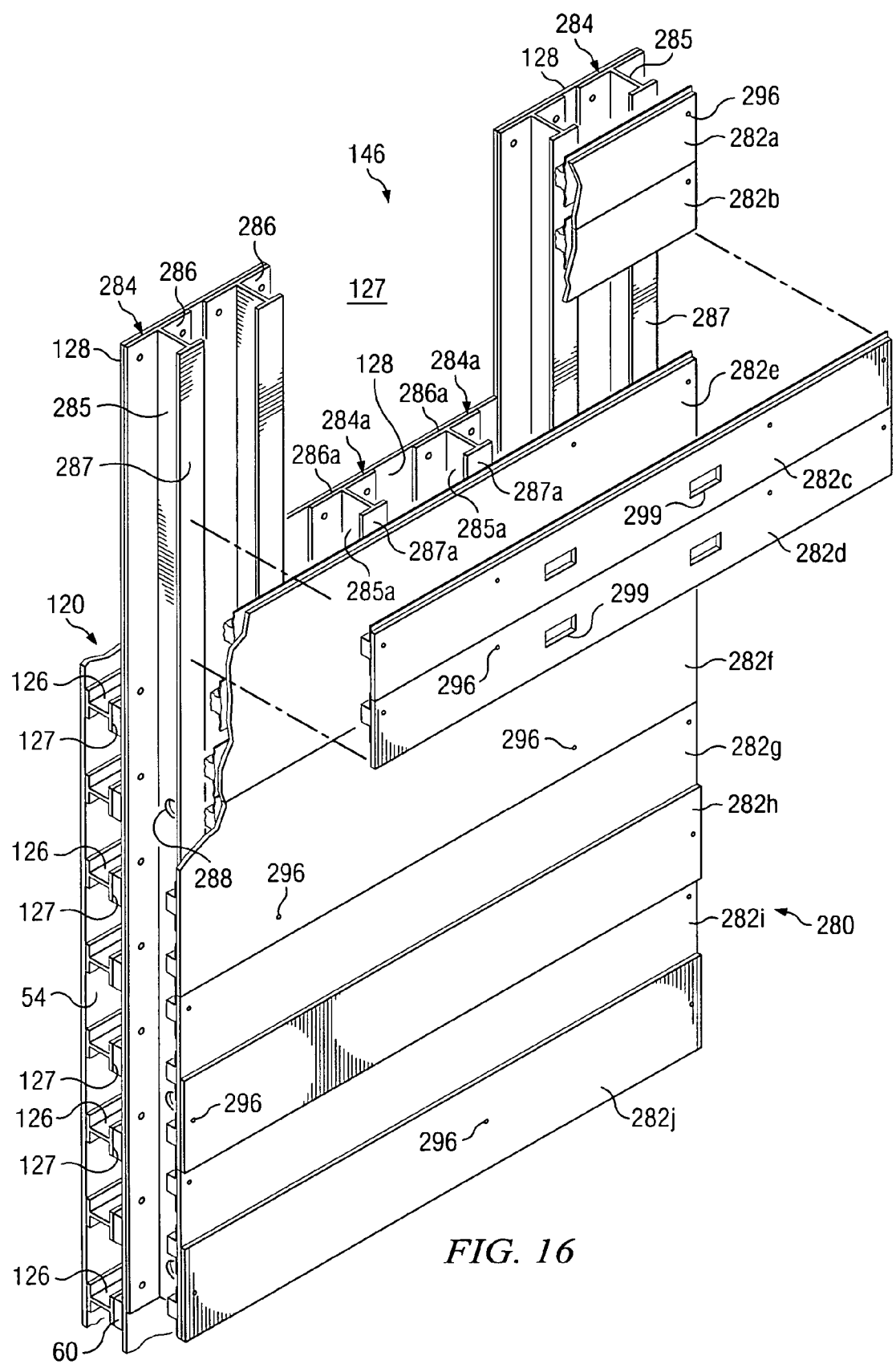
FIG. 16 is a schematic drawing showing an exploded isometric view with portions broken away of an interior bulk head disposed adjacent to the first endwall assembly of FIG. 14A.
Figure 17:
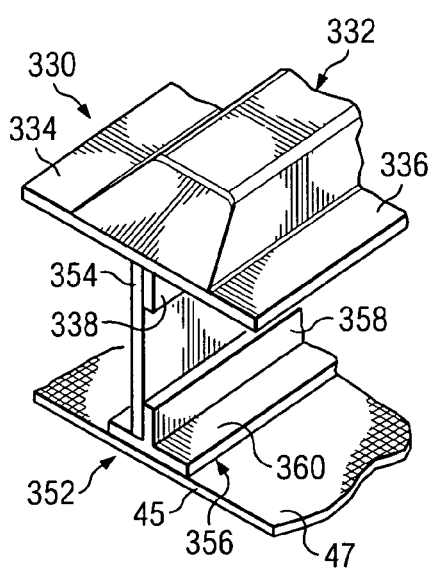
FIG. 17 is a schematic drawing showing an isometric view with portions broken away of a roof carline assembly incorporating teachings of the present invention.

As shown in FIGS. 14A, 14B and 16 the length of each panel 282 corresponds generally with the interior width of composite box structure 30. The width or height of each panel 282 may vary as shown in FIGS. 14A and 16. For purposes of describing various features of the present invention, channels 282 have been designated as 282a–282j. A plurality of plastic inserts 298 may be disposed within each opening 296 and associated channel 294 to cover the respective mechanical fastener 292. Plastic inserts 298 cooperate with each other to provide a smooth exterior surface on associated panels 282a through 282j. For some application, panels 282a through 282d may include recessed handles (not expressly shown) disposed in openings or slots 299. Slots 299 and associated handles allow removal of panels 282a through 282d to gain access to refrigeration unit 142 through opening 127.

For some applications interior bulkhead 380 may be attached to endwall assembly 122 to form an airflow path therebetween. Interior bulkhead 380 may include a plurality of panels 382 which extends substantially vertically between roof assembly 40 and floor assembly 80. For some applications each panel 382 may have approximately the same length, width and thickness. For purposes of describing various features of the present invention, panels 382 have been designated as 382a–e.

Panels 382 may be formed from the same materials as used to form panels 282. Channels or open beams 394 may be bonded with respective panels 382. For some applications channels 394 may be described as having a "hat-shaped" cross section. A plurality of holes or openings 396 can be formed in each panel 382. The location of holes 396 is preferably selected to correspond with associated end beams 126 of endwall assembly 122. Channels 394 and associated openings 396 may extend generally vertically along opposite longitudinal edges of each panel 382a, 382b, 382c, 382d and 382e. Openings 396 and channels 394 cooperate with each other to allow fasteners (not expressly shown) to be inserted through holes 396, channels 394 and securely engaged with adjacent end beams 126. Channels 394 may be formed from the same materials used to form channels 294. The same types of mechanical fasteners used to attach panels 282 with support beam 284 may also be used to attach panels 382 with portions of adjacent end beams 126. Previously described plastic inserts 298 may also be disposed within each opening 396 and associated channel 394 to cover the respective mechanical fastener.

Channels 394 provide an airflow path from plenum 300 to floor assembly 80. Also, the offset between panels 382 and endwall assembly 122 provides additional airflow paths from plenum 300 to floor assembly 80. For some applications scuff plates 398 and 400 shown in dotted lines may be disposed on interior bulkhead 380. Similar scuff plates may be provided on interior bulkhead 280. The end of plenum assembly 300 may be coupled with endwall assembly 122 and adjacent bulkhead 380 to direct airflow from plenum assembly 300 to the airflow paths formed between interior bulkhead 380 and endwall assembly 122.

As previously noted, layers 128 of endwall assemblies 120 and 122 may be formed from the same fiber reinforced material used to form layers 61 of sidewall assemblies 50 and 52 and layers 45 of roof assembly 40. However, other types of material may be satisfactorily used to form layers 128 because interior bulkheads 280 and 380 prevent direct contact between lading carried within composite box structure 30 and layers 128 of endwall assemblies 120 and 122.

Roof assembly 40 may be formed with a generally elongated, rectangular configuration. The length and width of roof assembly 40 corresponds generally with the desired length and width of composite box structure 30. Roof assembly 40 includes first longitudinal edge 41 and second longitudinal edge 42 spaced from each other and extending generally parallel with each other from first lateral edge 43 to second lateral edge 44. Roof assembly 40 may have a generally arcuate configuration extending from first longitudinal edge 41 to second longitudinal edge 42. See FIGS. 1B, 14A, 15A, 18 and 19.

Longitudinal edges 41 and 42 of roof assembly 40 may be disposed on leg 68 of respective top chords 64. For some applications welds (not expressly shown) may be used to securely engage longitudinal edges 41 and 42 of roof assembly 40 with adjacent portions of respective top chords 64. Lateral edges 43 and 44 are preferably mounted on and attached with respective endwall assemblies 120 and 122.

Various types of composite materials and insulating materials may be satisfactorily used to form roof assembly 40. For some applications, roof assembly 40 may be formed with a plurality of carline assemblies 330. See FIGS. 1A, 1B, 17, 18 and 19. Carline assemblies 330 may be generally described as supporting members of roof assembly 40 which extend laterally between respective top chords 64 of sidewall assemblies 50 and 52. The length of each carline assembly 330 may be substantially the same as the width of composite box structure 30.

Each carline assembly 330 preferably includes channel or open beam 332 and support assembly 352. Each channel 332 preferably includes respective flanges 334 and 336 extending therefrom. Channel 332 may be formed from various types of metal alloys such as aluminum alloys or steel alloys satisfactory for use in manufacturing a railway car. Support assembly 352 may be manufactured from various types of fiber reinforced plastic materials and may be formed using pultrusion techniques similar to layers or sheets 84a and 84b of pultruded panels 82.

Corrugated sheets 46 having a generally rectangular configuration may be satisfactorily used to form the exterior portions of roof assembly 40. Metal sheets 46 may have a length corresponding approximately with the width of composite box structure 30. The width of each metal sheet 46 may approximately equal the desired distance between adjacent carline assemblies 330. For some applications the longitudinal edges of each sheet 46 may be welded or otherwise securely attached with flanges 334 and 336 of adjacent carline assemblies 330. The corrugations associated with sheets 46 may be approximately one-sixteenth of an inch (1/16"). Sheets 46 may be formed from the same materials as channels 332.

Channels 332 may have various configurations and cross sections. For some applications channels 332 may have a cross section corresponding generally with a trapezoid. Each web 338 is preferably attached to and extends from interior portions of each channel 332. Each web 338 may be formed from the same materials as used to form channel 332. For some applications channels 332, webs 338 and sheets 46 may be formed from steel alloys or aluminum alloys.

Support assembly 352 preferably includes coupling 354 which may be formed from pultruded materials. Metal web 338 and coupling 354 may have a generally arcuate configuration corresponding approximately with the radius of curvature of roof assembly 40. Coupling web 354 may be attached to metal web 338 using various mechanical fasteners (not expressly shown). Support assembly 352 may include a generally "T" shaped support 356 which may be mechanically attached with coupling 354 opposite from each channel 332. Various types of mechanical fasteners (not expressly shown) and/or bonding techniques may be satisfactorily used to attach each T-shaped support 356 with associated coupling 354 and to attach coupling 354 with web 338. T-shaped support 356 preferably includes rib 358 and flange 360.

Sheets of fiber reinforced material may attached with flanges 360 to form layer 45 of roof assembly 40. Insulating material 58 may be bonded with interior portions of channel 332, interior portions of sheets 46 and interior surface 47 of layer 45. Layer 45 provides an interior surface for roof assembly 40.

Figure 18:
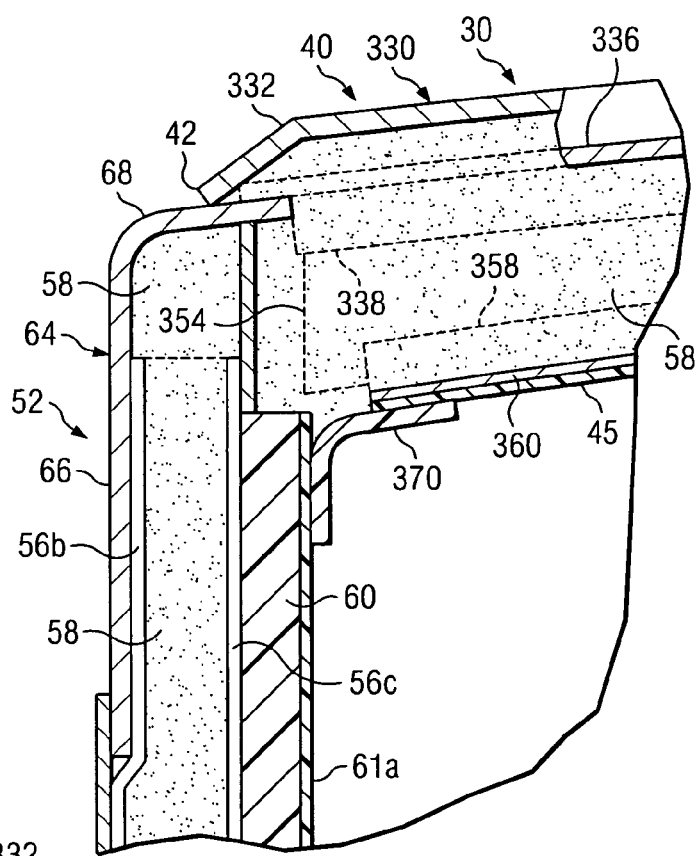
FIG. 18 is a schematic drawing in section and in evaluation with portions broken away showing a joint form between a sidewall assembly and a roof assembly incorporating teachings of the present invention.
Figure 19:
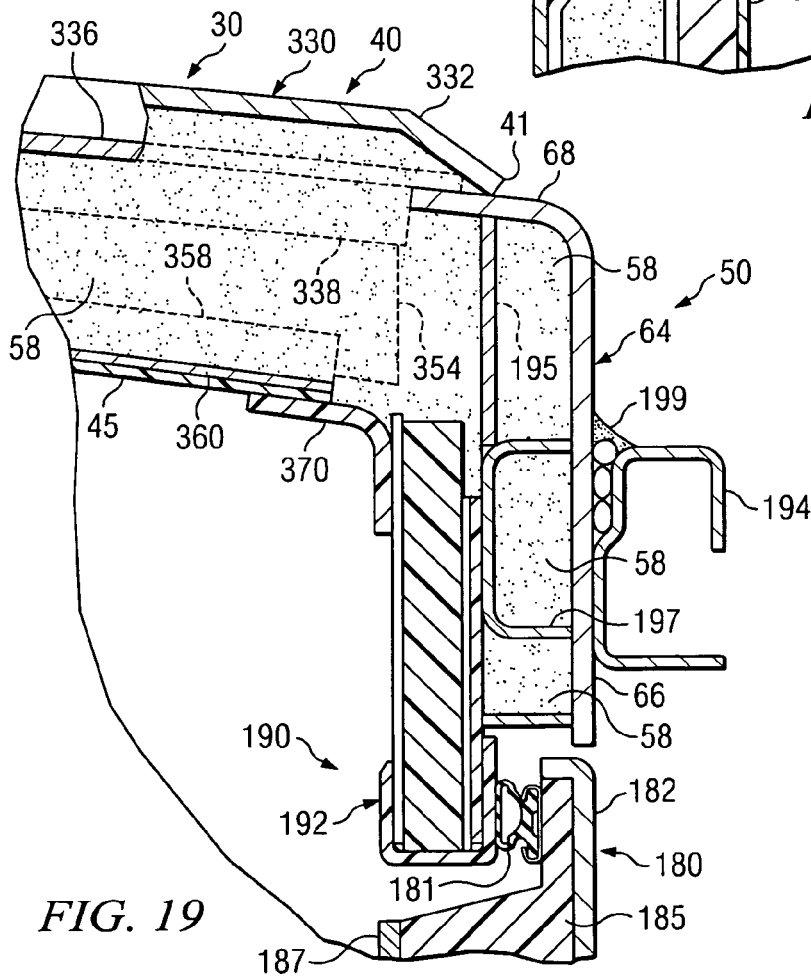
FIG. 19 is a schematic drawing in section and in evaluation with portions broken away showing the upper portion of a door assembly mounted on a sidewall assembly incorporating teachings of the present invention.

Each endwall assembly 120 and 122 preferably includes a respective top chord or top plate (not expressly shown) attached with upper portions of adjacent metal sheets 54. Roof assembly 40 may be attached to and/or bonded with respective top chords 64 of sidewall assemblies 50, 52 and top chords or top plates of endwall assemblies 120 and 122. As shown in FIGS. 18 and 19, insulating foam is preferably disposed within the joint or flexible connection formed between roof assembly 40 and adjacent portions of sidewall assemblies 50 and 52. An end closure having a generally arcuate shape may also be disposed between respective top plates (not expressly shown) of endwall assemblies 120 and 122 and adjacent portions of roof assembly 40. Trim molding may be bonded with adjacent portions of roof assembly 40 and sidewall assemblies 50 and 52 and adjacent portions of roof assembly 40 and endwall assemblies 120 and 122.

Various types of doors may be satisfactorily used with composite box structure 30, including doors fabricated from steel and/or wood, or doors fabricated from composite materials. Door closing bracket 209 and door opening bracket 211 may be disposed on the exterior of each sidewall assembly 50 and 52 to assist with opening and closing of attached door assemblies 180. See FIG. 1A.

Door assembly 180 as shown in FIG. 19 may be formed from materials with thermal insulation characteristics corresponding with the associated sidewall assemblies 50 and 52. Steel door 182 may be used to form exterior portions of door assembly 180. The length of steel door 182 corresponds approximately with the height of associated opening 36. The width of steel door 182 corresponds approximately with the width of opening 36. Liner 185 may be attached to and bonded with interior surfaces of steel door 182. Liner 185 may be formed from various types of insulating materials including urethane foam with heat transfer characteristics similar to insulating materials 58. Layer 187 of fiber reinforced material with corrugations or channels 63 formed therein may also be attached to liner 185 opposite from steel door 182.

The combined thickness of liner 185 and steel door 182 is preferably selected to be approximately equal with the thickness of associated sidewall assemblies 50 and 52. The length of a crank arm (not expressly shown) associated with each door assembly 180 is preferably selected to allow liner 185 to satisfactorily clear adjacent portions of door frame assembly 190 and the associated sidewall assemblies 50 and 52 when door assemblies 180 are moved between their first closed position to their second open position. Steel door 182 may be obtained from various vendors such as Youngstown Steel Door. Liner 185 may be obtained from various manufacturers such as Martin Marietta Corporation.

Each door assembly 180 may be mounted on respective sidewall assemblies 50 and 52 using conventional hardware such as operating pipes, operating mechanisms, rollers, locking bars, gears and cams associated with conventional railway boxcars. Such items may be obtained from several vendors including YSD Industries, Inc. (Youngstown Steel Door), and Pennsylvania Railcar.

Portions of door frame assembly 190, which may be satisfactorily used with door assembly 180, are shown in FIGS. 1A, 3 and 19. Typically, each door assembly 180 will be slidably mounted on upper track 194 and lower track 196 which are attached adjacent to respective openings 36. See FIG. 1A. Door frame assembly 190 may include upper track 194, adjacent portions of top chord 64, C-shaped channel 197, plate 195 and other components such as shown in FIG. 19. Upper track 194 may be attached with adjacent portions of top chord 64. Sealing material 199 may be disposed between upper track 194 and leg 66 of top chord 64. Various welding techniques and/or mechanical fasteners may be used as desired.

As shown in FIG. 3, door frame assembly 190 is preferably attached to the perimeter of each opening 36 formed in respective sidewall assemblies 50 and 52. Each door frame assembly 190 may include a pair of vertical door post assemblies 191 and door header or door retainer 192. Upper door track 194, lower door track 196, and a threshold (not expressly shown) may also be installed adjacent to each door frame assembly 190. Vertical door post assemblies 191 are securely attached with adjacent portions of sidewall assemblies 50 and 52. Door header 192 is disposed between and attached to vertical door post assemblies 191 at the top of each opening 36.

Portions of each door frame assembly 190 may be offset from the exterior of associated sidewall assemblies 50 and 52 to receive respective door assemblies 180. A corresponding offset (not expressly shown) may also be formed in adjacent portions of thresholds (not expressly shown) at respective openings 36. The resulting offsets at each opening 36 accommodate door frame assembly 190 and particularly door post assemblies 191 to allow the associated door assembly 180 and its operating mechanism to fit within the desired AAR clearance envelope.

Metal plates (not expressly shown) and/or an elastomeric thresholds may be disposed within the lower portion of each opening 36 adjacent to floor assembly 80. The metal plates and/or threshold may be formed from steel alloys, aluminum alloys, ceramic materials and/or composites of these materials.

Elastomeric gasket 181 may be attached to the interior of each door assembly 180 adjacent to the perimeter of the door assembly 180. Elastomeric gasket 181 preferably contacts adjacent portions of door frame assembly 190 when the respective door assembly 180 is in its first, closed position. Elastomeric gasket 181 and portions of door frame assembly 190 cooperate with each other to minimize heat transfer between the interior and the exterior of composite box structure 30, when the respective door 180 is in its first, closed position. Door stops 266 and 268 may be mounted on the exterior of each sidewall assembly 50 and 52 to limit movement of the associated door assembly 180 from its first position to its second position.

After assembly of top chord 64, support posts 56, side sill 252, side sheets 54 and isolators 60a, 60b and 60c along with layers 61a and 61b of fiber reinforced plastic, a plurality of injection blocks (not expressly shown) may be disposed between portions of top chord 64 and adjacent portions of support posts 56. A plurality of openings are preferably formed within each injection block to allow injecting liquid insulating foam into the associated void spaces defined in part by interior surface 55 of metal sheet 54, adjacent portions of support posts 56 and the interior surface of first layers 61. The injection block may be formed from substantially the same material as the liquid insulating foam which will be injected into sidewall assembly 50. After the liquid insulating foam is solidified, the injection blocks form an integral component of the associated foam insulation 58. Injection blocks or foam dams may be attained from various suppliers such as R.Max located in Dallas, Tex. Liquid insulating foam, sometime referred to as pour foam, may be obtained from various vendors including Carpenter Foam Co. and Foam Supply, Inc. (FSI). FSI is located in Dallas, Tex.

Each sidewall assembly 50 and 52 with first layers 61 disposed on isolators 60a, 60b and 60c, support posts 56 and side sheets 54 may be placed within a foam press (not expressly shown) to maintain desired temperatures for forming insulating material 58 from the liquid insulating foam injected therein. Forming insulating material 58 in accordance with teachings of the present invention results in insulating material 58 bonding with interior surface 55 of metal sheets 54, adjacent portions of support post 56 and the interior surfaces of layers 61. Slats (not expressly shown) may be placed in corrugations 63 to protect corrugations 63 during the foaming and pressing process associated with forming insulating material 58.

For some applications sidewall assemblies 50 and 52 may be disposed at an angle between approximately eight (8) degrees and twelve (12) degrees in a foam press to allow the desired formation of insulating material 58 and associated adhesive bonds. For some applications sidewall assemblies 50 and 52 may be disposed at an angle of approximately ten (10) degrees during injection of liquid insulating foam and the formation of solid foam insulation 58. The angle may be varied depending upon the configuration of the respective sidewall assembly or endwall assembly and the type of insulating foam.

Various types of foam presses (not expressly shown) may be satisfactorily used to form sidewall assemblies and endwall assemblies in accordance with teachings of the present invention. Foam presses are available from various manufacturers including CON-TEK Machine, Inc., located at 3575 Hoffman Road East, St. Paul, Minn.

For purposes of describing various features of the present invention, sidewall assemblies 50 and 52 will be described with respect to forming an associated sidewall frame assembly. Each sidewall frame assembly may include a plurality of support posts 56, respective side sill assemblies 250, 252 and respective top chords 64. Each sidewall frame assembly also includes portions of associated door frame assembly 190.

A first end of each support post 56 may be attached to adjacent portions of associated top chord 64. As second end of each support post 56 may be attached to adjacent portions of respective side sill assemblies 250 or 252. Support posts 56, top chords 64 and respective side sill assemblies 250 or 252 cooperate with each other to define a generally elongated, rectangular configuration corresponding with associated sidewall assemblies 50 or 52. A plurality of metal sheets 54 are preferably attached with the exterior surface of each sidewall frame assembly.

For purposes of describing various features of the present invention, endwall assemblies 120 and 122 will be described with respect to forming an associated endwall frame assembly. Each endwall frame assembly may include a respective top plate or top chord (not expressly shown), bottom plate 124 and edge plates (not expressly shown) attached thereto and extending therebetween. The top plate, bottom plate 124 and edge plates form a generally rectangular pattern corresponding with associated endwall assembly 120 and 122.

A plurality of end beams 126 may also be attached with associated edge plates. The first end of each end beam 126 may be attached to a first edge plate. The second end of each end beam 126 may be attached to a second edge plate. End beams 126 are preferably spaced from each other and extend generally parallel with the associated top plate and the bottom plate 124. A plurality of metal sheets 54 may be attached with the exterior of each endwall frame assembly.

For some applications a plurality of openings (not expressly shown) may be formed in one or more edge plates. The openings may be used to inject liquid insulating foam into respective void spaces when each endwall frame assembly with isolators 60 and layer 128 have been placed into a foam press. The number and size of the openings formed in each edge plate will depend upon the configuration and size of associated void spaces formed between adjacent end beams 126.

A temperature controlled railway car formed in accordance with teachings of the present invention may have the following features:

286,000 lb. Gross Rail Load;
Standard car equipped with insulated single plug door
15" end-of-car cushioning unit;
Meets AAR Plate "F" Clearance Diagram;
State-of-the art temperature control unit, exterior service platform and interior access door;
Satellite monitoring and control system;
An airflow management system installed in the interior of the composite box structure;
High performance insulating materials;
Durable, wood free interior materials; and
No ferrous metals in the interior.

| | |
|---|---|
| Length Inside | 72'–2" |
| Length Over Coupler Pulling Faces | 82'–2" |
| Length over Strikers | 77'–10" |
| Length Between Truck Centers | 52'–0" |
| Truck Wheel Base | 5'–10" |
| Width, Extreme | 10'–6⅝" |
| Width, Inside | 9'–2" |
| Height, Extreme | 16"–11⅞" |
| Height Inside at Center Line of Car | 12'–1½" |
| Estimated Lightweight | 105,000 lbs. |
| Estimated Load Limit - Based on 286,000 lbs. Gross Rail Load | 181,000 lbs. |
| Gross Rail Load | 286,000 lbs. |
| Cubic Capacity (Between bulkheads) | 8,012 cubic feet |
| Cubic Capacity (Level with height of sides) | 7,883 cubic feet |

Although the present invention and its advantages have been described in detail, it should be understood that various changes, substitutions and alternations can be made herein without departing from the spirit and scope of the invention as defined by the following claims.

What is claimed is:

1. An insulated railway boxcar comprising:
a railway car underframe having a floor assembly mounted thereon and attached thereto;
a pair of sidewall assemblies respectively mounted on and attached to opposite sides of the railway car underframe;
a pair of endwall assemblies respectively mounted on and attached to opposite ends of the railway car underframe;
each sidewall assembly formed in part from a plurality of metal sheets, metal support posts, and horizontal strips of fiber reinforced material;
each endwall assembly formed in part from a plurality of metal sheets, metal end beams, and layers of fiber reinforced material;
exterior surfaces of the metal sheets cooperating with each other to form exterior surfaces of the insulated railway car box;
each support post and each end beam having a first surface and a second surface;
the first surfaces of each support post and each end beam respectively attached to interior surfaces of adjacent metal sheets;
the support posts and end beams spaced from each other to partially define void spaces with respect to the interior surfaces of adjacent metal sheets;
respective isolators attached to the second surface of each metal support post and each metal end beam;
the horizontal strips of fiber reinforced material disposed on the isolators and covering respective void spaces defined in part by the interior surfaces of the adjacent metal sheets and the associated metal support posts or metal end beams;
insulating materials disposed within each void space; and
each sidewall assembly having at least a first horizontal strip of fiber reinforced material and a second horizontal strip of fiber reinforced materials with a plurality of generally vertical corrugations formed in each horizontal strip of fiber reinforced material.

2. The insulated railway boxcar of claim 1 wherein the layers of fiber reinforced material further comprise a ballistic resistant fabric.

3. The insulated railway boxcar of claim 1 wherein the floor assembly further comprises:
a primary floor and a secondary floor;
the primary floor mounted on and attached to the railway car underframe;
a plurality of support beams disposed on the primary floor opposite from the railway car underframe; and
a plurality of openings formed in the support beams to allow air circulation between the secondary floor and the primary floor.

4. The insulated railway boxcar of claim 1 further comprising:
the metal sheets formed from the group consisting of steel alloys and aluminum alloys;
the support posts and end beams formed from the group consisting of steel alloys and aluminum alloys; and
the fiber reinforced material comprising fiber reinforced plastic.

5. An insulated railway boxcar comprising:
a railway car underframe having a floor assembly mounted thereon and attached thereto;
a pair of sidewall assemblies respectively mounted on and attached to opposite sides of the railway car underframe;
a pair of endwall assemblies respectively mounted on and attached to opposite ends of the railway car underframe;
each sidewall assembly formed in part from a plurality of metal sheets, support posts, horizontal strips of fiber reinforced material;
each endwall assembly formed in part from a plurality of metal sheets, end beams, layers of fiber reinforced material;
each support post and each end beam having a first surface and a second surface;
the first surfaces of each support post and each end beam respectively attached to interior surfaces of adjacent metal sheets;
the support posts and end beams spaced from each other to partially define void spaces with respect to the interior surfaces of adjacent metal sheets;
respective isolators attached to the second surface of each support post and each end beam;
the horizontal strips of fiber reinforced material disposed on the isolators and covering respective void spaces defined in part by the interior surfaces of the adjacent metal sheets and the associated support posts or end beams;
insulating materials disposed within each void space; and
the isolators formed in part from urethane foam blocks.

6. An insulated railway boxcar comprising:
a railway car underframe having a floor assembly mounted thereon and attached thereto;

a pair of sidewall assemblies mounted on and attached to respective opposite sides of the railway car underframe;

a pair of endwall assemblies mounted on and attached to respective opposite ends of the railway car underframe;

each sidewall assembly formed in part from a plurality of metal sheets, support posts, horizontal strips of fiber reinforced material;

each endwall assembly formed in part from a plurality of metal sheets, end beams, layers of fiber reinforced material;

each support post and each end beam having a first surface and a second surface;

the first surfaces of each support post and each end beam respectively attached to adjacent metal sheets;

the support posts and end beams spaced from each other to partially define void spaces with respect to the adjacent metal sheets;

respective isolators attached to the second surface of each support post and each end beam;

the horizontal strips of fiber reinforced material disposed on the isolators and covering respective void spaces defined in part by the interior surfaces of the adjacent metal sheets and the associated support posts or end beams;

insulating materials disposed within each void space;

the railway car underframe having a plurality of cross members;

the floor assembly having a plurality of pultruded channels spaced from each other and extending laterally across the width of the floor assembly; and the pultruded channels disposed on respective cross members.

7. A railway boxcar comprising:

a railway car underframe having a floor assembly mounted thereon and attached thereto;

the floor assembly including a primary floor assembly and a secondary floor assembly;

the primary floor assembly having a plurality of pultruded panels mounted on and attached to the railway car underframe;

the secondary floor assembly having a plurality of first support beams and second support beams disposed on the primary floor assembly opposite from the railway car underframe;

the first support beams and the second support beams having generally I shaped cross sections defined in part by a first flange and a second flange with a respective web disposed therebetween;

the first set of support beams disposed on the primary floor assembly adjacent to openings of each sidewall assembly;

the webs of the first section of support beams having a reduced height as compared with the web of the second of support beams;

a plurality of deck plates disposed on the first set of support beams adjacent to the openings in the respective sidewall assemblies; and the difference in height of the webs of the support beam and the second support beam approximately equal to the thickness of the deck plates whereby the secondary floor assembly provides a generally uniform transition from the deck plates to the adjacent flanges associated with the second set of support beams.

8. A temperature controlled railway car comprising:

a railway car underframe having a floor assembly mounted thereon and attached thereto;

the railway car underframe and the floor assembly having generally elongated, rectangular configurations;

a pair of sidewall assemblies mounted on and attached to opposite sides of the railway car underframe;

a pair of endwall assemblies mounted on and attached to opposite ends of the railway car underframe;

a roof assembly attached to the sidewall assemblies and the endwall assemblies opposite from the floor assembly;

each sidewall assembly formed from a plurality of metal sheets attached to and extending between a respective top chord and a respective side sill assembly;

the metal sheets having respective exterior surfaces and interior surfaces;

a plurality of support posts respectively attached to the interior surfaces of the metal sheets;

at least two horizontal strips of fiber reinforced material disposed on the support posts opposite from the metal sheets to form a respective interior surface for each sidewall assembly;

insulating materials disposed between and bonded with respective interior surfaces of the metal sheets portions of the support posts and the layers of fiber reinforced material;

a plurality of generally vertical corrugations formed in the horizontal strips of fiber reinforced material;

a first scuff plate and a second scuff plate disposed on the interior surface of each sidewall assembly;

the second scuff plate spaced vertically from the first scuff plate; and a plurality of support assemblies disposed between the second scuff plate and the adjacent support posts.

9. The temperature controlled railway car of claim 8 wherein each support assembly further comprises:

a housing having a cavity formed therein;

a metal attachment plate disposed within the cavity;

a layer of insulating foam disposed within the cavity to cover the metal attachment plate; and the housing securely attached to the adjacent support post.

10. The temperature controlled railway car of claim 8 further comprising:

a respective joint formed between each sidewall assembly and the roof assembly;

each joint extending longitudinally from a first end of the sidewall assembly to a second of the sidewall assembly;

each joint filled with insulating material to minimize heat transfer between the interior and the exterior of the railway car proximate the respective joint; and a layer of trim molding bonded with the insulating material.

11. A sidewall assembly for use in forming a composite box structure mounted on a railway car underframe comprising:

a top chord extending along an upper edge of the sidewall assembly and a side sill assembly extending along a lower edge of the sidewall assembly;

a plurality of support posts disposed between and attached to the top chord and the side sill assembly;

a plurality of metal sheets with each metal sheet having an interior surface and an exterior surface;

respective portions of the interior surfaces of the metal sheets attached with the support posts, the top chord and the side sill assembly whereby the exterior surfaces of the metal sheets cooperate with each other to form an exterior surface of the sidewall assembly;

a first isolator and a second isolator attached to each support post opposite from the metal sheets;

layers of fiber reinforced material disposed on the isolators opposite from the support posts;

insulating material disposed between and bonded with the interior surfaces of the metal sheets, adjacent portions of the support posts and the layers of fiber reinforced material;

a scuff plate support assembly disposed between the first isolator and the second isolator on each support post;

the scuff plate support assembly securely engaged with the respective support post; and a scuff plate mounted on the scuff plate support assemblies.

12. The sidewall assembly of claim 11 wherein the fiber reinforced material comprises fiber reinforced plastic.

13. The sidewall assembly of claim 11 further comprising:

the top chord having a generally inverted "L" shaped cross section with one leg extending from the inverted "L" shaped cross section; and portions of the interior surfaces of the metal sheets attached with the one leg of the top chord.

14. An insulated railway boxcar having a composite box structure mounted on a railway car underframe comprising:

a pair of endwall assemblies with each endwall assembly having a respective bottom plate and a plurality of end beams spaced from each other;

a plurality of metal sheets with each metal sheet having an interior surface and an exterior surface;

the interior surfaces of the metal sheets attached with respective end beams whereby the exterior surface of the metal sheets cooperate with each other to form an exterior surface of the associated endwall assembly;

respective layers of fiber reinforced material disposed on the end beams opposite from the metal sheets;

insulation material disposed between the interior surfaces of the metal sheets and the respective layers of fiber reinforced material;

an opening formed in one of the endwall assemblies to receive at least a portion of a temperature control unit;

a plurality of support beams attached to the end beams of the one endwall assembly with the respective layers of fiber reinforced material disposed therebetween;

the support beams having a first flange and a second flange with a web disposed therebetween;

the first flange having a width greater than the width of the second flange;

a plurality of mechanical fasteners extending through the first flange to securely engage the associated support beam with the adjacent end beams; and the difference between the width of the second flange and the first flange selected to allow installation of the mechanical fasteners.

15. The railway boxcar of claim 14 further comprising:

a plurality of isolators attached to each end beam opposite from the metal sheets; and the respective layers of fiber reinforced material disposed on the isolators.

16. The railway car of claim 14 further comprising:

an interior bulkhead attached to the support beams assembly;

an opening formed in the interior bulkhead generally aligned with the opening in the endwall assembly to provide access to the temperature control unit;

a plurality of removable panels attached to the opening in the interior bulkhead; and the removable panels having recessed handles to allow access to the temperature control unit through the opening in the interior bulkhead.

17. A temperature controlled railway car comprising:

the railway car underframe having a generally rectangular configuration defined in part by a center sill and a plurality of cross members;

a pair of substantially rectangular sidewall assemblies mounted on and secured with opposite sides of the railway car underframe;

each sidewall assembly having an interior surface;

an opening formed in each sidewall assembly to provide access to an interior of the composite box structure for loading and unloading lading;

a pair of substantially rectangular endwall assemblies mounted on and secured with opposite ends of the railway car underframe;

a substantially rectangular floor assembly mounted on the railway car underframe;

the floor assembly extending between portions of the sidewall assemblies and portions of endwall assemblies adjacent to the railway car underframe;

a roof assembly mounted on and attached to each sidewall assembly and each endwall assembly opposite from the floor assembly;

the floor assembly formed by a plurality of generally rectangular panels filled with insulating material;

each panel coupled with an adjacent panel;

the length of each panel corresponding approximately with the distance between the respective interior surfaces of the sidewall assemblies;

the width of each panel approximately equal to the lateral spacing between associated cross members of the railway car underframe; and at least one expansion joint disposed between two adjacent panels.

18. The railway car of claim 17 wherein the expansion joint between the two adjacent panels further compromises:

a generally hollow beam having a generally rectangular cross section;

the hollow beam filled with insulating materials; and a longitudinal slot formed in the hollow beam to allow flexing of the hollow beam in response to temperature changes.

19. The railway car of claim 17 further comprising flexible caulking compound disposed in the longitudinal slot.

20. A composite box structure mounted on a railway car underframe comprising:

a floor assembly mounted and attached to the railway car underframe;

a pair of sidewall assemblies having respective openings formed therein to provide access to the composite box structure for loading and unloading lading;

the sidewall assemblies mounted on opposite side of the railway car underframe;

a pair of endwall assemblies mounted on opposite ends of the railway car underframe;

the sidewall assemblies having respective exterior surfaces formed by a plurality of metal sheets;

the metal sheets having respective exterior surfaces and interior surfaces;

a plurality of support posts attached to the interior surfaces of the metal sheets;

respective isolators attached to each support post opposite from the metal sheets;

a layer of fiber reinforced material disposed on the isolators opposite from the support posts to form respective interior surfaces for each sidewall assembly;

insulating material disposed between the support posts, adjacent interior surfaces of the metal sheets and the fiber reinforced material;

a respective first scuff plate disposed on the interior surface of each sidewall assembly proximate the floor assembly;

a respective second scuff plate disposed on the interior surface of each sidewall assembly spaced from the first scuff plate; and each scuff plate having a first portion extending longitudinally from the opening in the respective sidewall assembly to one of the endwall assemblies and a second portion extending longitudinally from the opening in the respective sidewall assembly to the other endwall assembly.

* * * * *